(12) United States Patent
Nomoto

(10) Patent No.: US 8,107,768 B2
(45) Date of Patent: Jan. 31, 2012

(54) IMAGE PROCESSING APPARATUS, IMAGE PROCESSING METHOD, PROGRAM FOR IMPLEMENTING THE METHOD, AND STORAGE MEDIUM STORING THE PROGRAM

(75) Inventor: Masakazu Nomoto, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 1726 days.

(21) Appl. No.: 11/148,272

(22) Filed: Jun. 9, 2005

(65) Prior Publication Data

US 2005/0278636 A1    Dec. 15, 2005

(30) Foreign Application Priority Data

Jun. 9, 2004   (JP) .................................. 2004-171635
Feb. 22, 2005  (JP) .................................. 2005-046025

(51) Int. Cl.
*G06K 9/20* (2006.01)

(52) U.S. Cl. ........ 382/282; 382/309; 382/311; 345/619; 345/622; 345/625; 345/626; 345/627; 345/628; 715/700; 715/764; 715/781

(58) Field of Classification Search ............... 382/282, 382/309–311; 715/200, 243, 246, 255, 700, 715/764, 781; 345/619, 622, 625–627
See application file for complete search history.

(56) References Cited

U.S. PATENT DOCUMENTS

| | | | | |
|---|---|---|---|---|
| 5,371,851 A | * | 12/1994 | Pieper et al. ................. | 345/501 |
| 5,513,309 A | * | 4/1996 | Meier et al. .................. | 715/860 |
| 6,160,923 A | * | 12/2000 | Lawton et al. ................ | 382/275 |
| 6,340,967 B1 | * | 1/2002 | Maxted ......................... | 345/179 |
| 6,965,454 B1 | * | 11/2005 | Silverbrook et al. .......... | 358/1.9 |
| 7,721,226 B2 | * | 5/2010 | Barabe et al. ................. | 715/810 |
| 2003/0182630 A1 | * | 9/2003 | Saund et al. .................. | 715/530 |
| 2004/0091237 A1 | * | 5/2004 | Hong ............................. | 386/46 |
| 2004/0135824 A1 | * | 7/2004 | Fitzmaurice .................. | 345/856 |

FOREIGN PATENT DOCUMENTS

| | | |
|---|---|---|
| JP | 62-073327 A | 4/1987 |
| JP | 5-189149 A | 7/1993 |
| JP | 8-14822 B2 | 2/1996 |
| JP | 8-63597 A | 3/1996 |
| JP | 8-297668 A | 11/1996 |
| JP | 2000-151985 A | 5/2000 |
| JP | 2001-183731 A | 7/2001 |
| JP | 2001-216515 A | 8/2001 |
| JP | 2003-044837 A | 2/2003 |

* cited by examiner

*Primary Examiner* — Vikkram Bali
*Assistant Examiner* — Julian Brooks
(74) *Attorney, Agent, or Firm* — Fitzpatrick, Cella, Harper & Scinto

(57) ABSTRACT

An image processing apparatus which makes it possible to automatically defining a processing area in which image processing is to be performed according to the type of image processing, to thereby improve user friendliness. A starting point and an ending point are designated on an image displayed on a display, and coordinates as information on the designated points are acquired. A type of image processing to be performed on the displayed image is selected from among a plurality of types of image processing, and information on the selected type is acquired. An editing area on the displayed image, in which the displayed image is to be subjected to the selected type of image processing, is defined according to the information on the designated points and the selected type of image processing. The display of the image in the defined editing area can be changed.

11 Claims, 27 Drawing Sheets

ENDING POINT

STARTING POINT

ENDING POINT

| DIRECTORY INFORMATION |
| --- |
| GROUP OF PROGRAM CODES RELATED TO DISPLAY |
| GROUP OF PROGRAM CODES RELATED TO ACQUISITION OF RANGE |
| GROUP OF PROGRAM CODES RELATED TO DETECTION OF RANGE |
| GROUP OF PROGRAM CODES RELATED TO SELECTION OF TYPE |
| GROUP OF PROGRAM CODES RELATED TO DISPLAY CONTROL |
| GROUP OF PROGRAM CODES RELATED TO ACQUISITION OF EXECUTING INSTRUCTION |
| GROUP OF PROGRAM CODES RELATED TO EXECUTION OF IMAGE PROCESSING |
| GROUP OF PROGRAM CODES RELATED TO OTHER PROCESSING |
| ⋮ |

IMAGE PROCESSING APPARATUS, IMAGE PROCESSING METHOD, PROGRAM FOR IMPLEMENTING THE METHOD, AND STORAGE MEDIUM STORING THE PROGRAM

CROSS REFERENCE TO RELATED APPLICATION

This application claims priority from Japanese Patent Applications Nos. 2004-171635 filed Jun. 9, 2004, and 2005-046025 filed Feb. 22, 2005, which are hereby incorporated by reference herein.

BACKGROUND OF THE INVENTION

1. Field of the Invention

The present invention relates to an image processing apparatus, an image processing method, a program for implementing the method, and a storage medium storing the program. In particular, the present invention relates to an image processing apparatus and an image processing method that perform image processing such as editing, correction, and processing on image data, a program for implementing the method, and a storage medium storing the program.

2. Description of the Related Art

A conventional image processing apparatus displays an image corresponding to image data on a screen on a LCD (Liquid Crystal Display) constituting a user interface, designates a predetermined processing range on the image displayed on the screen, and performs image processing such as trimming and color correction on the image in the designated processing range.

FIG. 29 is a diagram showing an example of the layout of a screen on the LCD of the conventional image processing apparatus.

As shown in FIG. 29, to define a predetermined rectangular processing range 9001 on an image displayed on a display screen 9000 (hereinafter referred to as "the window") on the LCD, first, a starting point 9001a is designated using a mouse as a pointing device of the image processing apparatus, and then an ending point 9001b is designated at a cursor position of the mouse which has been moved. It should be noted that a shape that defines the predetermined processing range 9001 should not necessarily be rectangular, and may be other shapes, but should be set in advance to one kind of shape.

Then, to determine what kind of image processing is to be performed on an image in the predetermined processing range 9001, an indicating point 9002 (cursor) of the mouse is moved to, for example, an "Edit" button 9003 among a plurality of menu buttons displayed on a menu selecting screen fixedly displayed at an edge of the window, and a desired menu item such as "Cut" or "Copy" is selected from among edit menus displayed as a result of the cursor movement.

In the above conventional image processing apparatus, to define the predetermined processing range 9001 over a wide range, the cursor of the mouse needs to be widely moved. If the cursor of the mouse is widely moved, the ending point must be designated far away from the menu selecting screen when the starting point lies at a position close to the menu selecting screen because the menu selecting screen is fixedly displayed at an edge of the window. On the other hand, to make the ending point closer to the menu selecting screen, the starting point must be designated at a position far away from the menu selecting screen. In either case, the cursor of the mouse must be moved by a longer distance than in designation of the predetermined processing range 9001.

It should be noted that the need to widely move the cursor of the mouse as mentioned above can be eliminated by applying a document editing process performed by an image processing apparatus, described later, to image processing performed by the conventional image processing apparatus.

Regarding the above-mentioned image processing apparatus, a technique of carrying out the document editing process in which a document is edited has been proposed (see Japanese Laid-Open Patent Publication (Kokai) No. H05-189149, for example).

FIG. 30 is a view showing an example of a screen displayed on a LCD when the conventional image processing apparatus carries out the document editing process.

In carrying out the document editing process on the screen of FIG. 30, a range including a character string to be subjected to document editing on the screen displayed on the LCD is designated using a stylus pen 9004 as a pointing device. Then, a menu selecting screen 9005 including a plurality of menu items indicative of editing function types is popped up in the vicinity of the designated range, and a menu item corresponding to a desired editing function is selected from among the plurality of menu items on the menu selecting screen 9005.

In a data editing apparatus that edits a plurality of types of data such as characters and figures, when designating a starting point and an ending point of a processing range to be edited, the shape of the processing range is changed to a suitable one according to the type of data existing in the processing range or at the starting point (see Japanese Laid-Open Patent Publication (Kokai) No. H08-297668, for example). As a result, the shape of the processing range is a shape of a line or lines for character data and a rectangular shape for figure data.

Further, in a document editing apparatus that edits document data, when an indicating point on a touch-sensitive panel is moved along a trace of a specific shape in a display range, it is determined that an instruction for editing the processing range, i.e. data displayed in a range drawn by the trace has been given, and as the contents of the editing instruction, a predetermined processing command is selected from among a plurality of processing commands according to the pattern of the trace (see Japanese Patent Publication (Kokoku) No. H08-014822, for example).

Also, a variety of methods have been proposed to detect an area including predetermined information on a person's face from image data (see Japanese Laid-Open Patent Publications (Kokai) Nos. H08-063597, 2001-216515, and 2001-183731, for example).

In the above image processing apparatus, however, it is necessary to designate the starting point 9001a and the ending point 9001b of the predetermined processing range 9001 before determining the type of image processing to be performed on an image, and hence the shape that defines the predetermined processing range 9001 needs to be set in advance to only one kind such as a rectangular shape. That is, the shape that defines the predetermined processing range 9001 cannot be changed once the starting point 9001a and the ending point 9001b of the predetermined processing range 9001 have been designated.

Since the predetermined processing range 9001 can be defined by only one kind of shape such as a rectangular or circular shape, although it is preferred that when image processing is to be performed on the entire image that represents a person's face, the shape of the processing range 9001 is rectangular, and when image processing is to be performed on a partial image such as a spot or mole on the skin of a person, the shape of the processing range 9001 is circular, it is necessary to set the shape of the processing range 9001 at least once so as to perform both types of image processing.

In the image processing as mentioned above, a plurality of types of processing can be ordinarily applied to a designated processing range, and the user can select a desired one from the plurality of types.

In the case where the method described above referring to FIG. 29 according to the prior art or the method disclosed in Japanese Laid-Open Patent Publication (Kokai) No. H05-189149 is applied to the image processing, a menu with the same format is displayed each time, and hence the user has to select a desired type from the menu each time after designating the processing range.

In the method disclosed in Japanese Laid-Open Patent Publication (Kokai) No. H08-297668, the processing range is selectively designated on a line basis or in a rectangular shape according to the type of data existing in the processing range, but the type of editing processing applied to the processing range is not taken into account. Therefore, in the case where the type of data to be edited is limited to image data, both character data and figure data included in the processing range are edited as image data, and as a result, it is impossible to change the way of designating the processing range according to whether the type of data is figure data or character data.

In the method described in Japanese Patent Publication (Kokoku) No. H08-014822, the processing range and the type of editing processing can be designated at the same time, and hence the user does not have to perform an operation for selecting the type, but has to memorize the patterns (shapes) of traces of an indicating point in association with a plurality of types.

SUMMARY OF THE INVENTION

It is a first object of the present invention to provide an image processing apparatus and an image processing method that make it possible to automatically define a processing area in which image processing is to be performed according to the type of image processing, to thereby improve user friendliness, a program for implementing the image processing method, and a storage medium storing the program.

It is a second object of the present invention to provide an image processing apparatus and an image processing method that make it possible to select one or more types of image processing when performing a plurality of types of image processing, such as correction or processing, for a processing range designated for image data, so that the user can easily select the type of image processing and perform image processing, a program for implementing the image processing method, and a storage medium storing the program.

To attain the first object, in a first aspect of the present invention, there is provided an image processing apparatus that performs a type of image processing selected from a plurality of types of image processing, on an image, comprising a display device that displays the image, a designating device that designates a predetermined position on the displayed image, a first acquiring device that acquires information on the designated predetermined position, a selecting device that selects a type of image processing to be performed on the displayed image from among the plurality of types of image processing, a second acquiring device that acquires information on the selected type of image processing, a defining device that defines a predetermined processing area on the displayed image, in which the displayed image is to be subjected to the selected type of image processing, according to the acquired information on the predetermined position and the acquired information on the selected type of image processing, and a display changing device that changes display of the image in the defined processing area.

With the arrangement of the first aspect of the present invention, user friendliness can be improved.

Preferably, the image processing apparatus comprises an image processing device that performs the selected type of image processing on at least part of the displayed image according to information on a part of the displayed image inside the defined processing area or a part of the displayed image outside the defined processing area and the selected type of image processing.

With this arrangement, image processing is performed on a processing range that is defined so as to acquire information on an image in a processing area or an image outside the processing area, and as a result, user friendliness can be improved.

More preferably, the plurality of types of image processing include a first type of image processing that predetermined image processing is performed on the displayed image according to the information on the part of the displayed image inside the defined processing area, and a second type of image processing that predetermined image processing is performed on the displayed image inside the defined processing area according to the information on the part of the displayed image outside the defined processing area.

With this arrangement, user friendliness can be further improved since selectable types of image processing can be increased.

More preferably, a plurality of shapes defining respective ones of the processing area are set in advance according to the type of image processing.

With this arrangement, there is no necessity of setting a shape that defines the range of a processing area according to the type of image processing each time image processing is performed, and as a result, user friendliness can be improved.

Preferably, the image processing apparatus comprises a second display device that displays a selecting screen for selecting a type of image processing to be performed on the displayed image from among the plurality of types of image processing in a vicinity of the acquired predetermined position.

With this arrangement, the user can easily select the type of image processing on a selecting screen after designating a predetermined position, and as a result, user friendliness can be improved.

More preferably, the designating device designates a first position and a second position different from the first position as the predetermined position, and the second display device displays the selecting screen in a vicinity of a later designated one of the designated first and second positions.

With this arrangement, user friendliness can be further improved.

To attain the first object, in a second aspect of the present invention, there is provided an image processing method of performing a type of image processing selected from a plurality of types of image processing, on an image, comprising a display step of displaying the image, a designating step of designating a predetermined position on the displayed image, a first acquiring step of acquiring information on the designated predetermined position, a selecting step of selecting a type of image processing to be performed on the displayed image from among the plurality of types of image processing, a second acquiring step of acquiring information on the selected type of image processing, a defining step of defining a predetermined processing area on the displayed image, in which the displayed image is to be subjected to the selected type of image processing, according to the acquired information on the predetermined position and the acquired information on the selected type of image processing, and a display changing step of changing display of the image in the defined processing area.

Preferably, the image processing method comprises an image processing step of performing the selected type of image processing on at least part of the displayed image according to information on a part of the displayed image inside the defined processing area or a part of the displayed image outside the defined processing area and the selected type of image processing.

More preferably, the plurality of types of image processing include a first type of image processing that predetermined image processing is performed on the displayed image according to the information on the part of the displayed image inside the defined processing area, and a second type of image processing that predetermined image processing is performed on the displayed image inside the defined processing area according to the information on the part of the displayed image outside the defined processing area.

More preferably, a plurality of shapes defining respective ones of the processing area are set in advance according to the type of image processing.

Preferably, the image processing method comprises a second display step of displaying a selecting screen for selecting a type of image processing to be performed on the displayed image from among the plurality of types of image processing in a vicinity of the acquired predetermined position.

More preferably, the designating step comprises designating a first position and a second position different from the first position as the predetermined position, and the second display step comprises displaying the selecting screen in a vicinity of a later designated one of the designated first and second positions.

To attain the first object, in a third aspect of the present invention, there is provided a program for causing a computer to execute an image processing method of performing a type of image processing selected from a plurality of types of image processing, on an image, comprising a display module for displaying the image, a designating module for designating a predetermined position on the displayed image, a first acquiring module for acquiring information on the designated predetermined position, a selecting module for selecting a type of image processing to be performed on the displayed image from among the plurality of types of image processing, a second acquiring module for acquiring information on the selected type of image processing, a defining module for defining a predetermined processing area on the displayed image, in which the displayed image is to be subjected to the selected type of image processing, according to the acquired information on the predetermined position and the acquired information on the selected type of image processing, and a display changing module for changing display of the image in the defined processing area.

To attain the first object, in a fourth aspect of the present invention, there is provided a computer-readable storage medium storing the program.

To attain the first object, in a fifth aspect of the present invention, there is provided an image processing apparatus capable of selectively carrying out a plurality of types of image processing on an image, comprising a first display controller that causes a display device to display the image, an area designating device that designates an area in which image processing is to be performed on the image displayed on the display device, a selecting device that selects a desired type of image processing from among the plurality of types of image processing, and a changing device that changes a shape of the area designated by the area designating device according to a result of selection by the selecting device.

With the arrangement of the fifth aspect of the present invention, user friendliness can be improved.

Preferably, the image processing method further comprises an instructing device that instructs execution of the type of image processing selected by the selecting device, and a second display controller responsive to the instruction by the instructing device, for causing the display device to display a result of execution of the type of image processing selected by the selecting device in the area with the shape thereof changed by the changing device.

Preferably, the image processing apparatus comprises an analyzing device that analyzes at least part of the displayed image inside the area designated by the area designating device, and the changing device changes the shape of the area designated by the area designating device according to the type of image processing selected by the selecting device and a result of the analysis by the analyzing device.

To attain the first object, in a sixth aspect of the present invention, there is provided an image processing method capable of selectively carrying out a plurality of types of image processing on an image, comprising a first display control step of causing a display device to display the image, an area designating step of designating an area in which image processing is to be performed on the image displayed on the display device, a selecting step of selecting a desired type of image processing from among the plurality of types of image processing, and a changing step of changing a shape of the area designated in the area designating step according to a result of selection in the selecting step.

Preferably, the image processing method further comprises an instructing step of instructing execution of image processing of the type selected in the selecting step, and a second display control step of causing the display device to display a result of execution of the type of image processing selected in the selecting step in the area with the shape thereof changed in the changing step, in response to the instruction in the instructing step.

Preferably, the image processing method comprises an analyzing step of analyzing at least part of the displayed image inside the area designated in the area designating step, and the changing step comprises changing the shape of the area designated in the area designating step according to the type of image processing selected in the selecting step and a result of the analysis in the analyzing step.

To attain the first object, in a seventh aspect of the present invention, there is provided a program for causing a computer to execute an image processing method capable of selectively carrying out a plurality of types of image processing on an image, comprising a first display control module for causing a display device to display the image, an area designating module for designating an area in which image processing is to be performed on the image displayed on the display device, a selecting module for selecting a desired type of image processing from among the plurality of types of image processing, and a changing module for changing a shape of the area designated by the area designating module according to a result of selection by the selecting module.

To attain the first object, in an eighth aspect of the present invention, there is provided a computer-readable storage medium storing the program.

To attain the second object, in a ninth aspect of the present invention, there is provided an image processing apparatus that performs a type of image processing selected from among a plurality of types of image processing, on an image, comprising a display device that displays the image on a screen, a range designating device that designates a first range on the displayed image, a range detecting device that detects at least one second range having predetermined characteristics on the displayed image from the displayed image, and a processing type selecting device that selects at least one type of image processing to be performed on the displayed image from among the plurality of types of image processing according to a predetermined relationship between the first range and the second range.

With the arrangement of the ninth aspect of the present invention, one or more types of image processing among a plurality of types of image processing are automatically selected for the first range designated for image data, making it easier for the user to select the type of image processing and execute image processing.

Preferably, the display device displays an indication of the at least one selected type on the screen.

Preferably, the image processing apparatus comprises an execution setting device that makes a setting as to whether the selected type of image processing is to be executed, and an image processing device that executes the type of image processing that has been set to be executed by the execution setting device.

Preferably, the predetermined characteristics comprise information on a person's face.

Preferably, the predetermined relationship between the first range and the second range comprises a positional relationship.

Preferably, the predetermined relationship between the first range and the second range comprises an area ratio.

To attain the second object, in a tenth aspect of the present invention, there is provided an image processing method of performing a type of image processing selected from among a plurality of types of image processing, on an image, comprising a display step of displaying the image on a screen, a range designating step of designating a first range on the displayed image, a range detecting step of detecting at least one second range having predetermined characteristics on the displayed image from the displayed image, and a processing type selecting step of selecting at least one type of image processing to be performed on the displayed image from among the plurality of types of image processing according to a predetermined relationship between the first range and the second range.

Preferably, the display step comprises displaying an indication of the at least one selected type on the screen.

Preferably, the image processing method comprises an execution setting step of making a setting as to whether the selected-type of image processing is to be executed, and an image processing step of executing the type of image processing that has been set to be executed in the execution setting step.

Preferably, the predetermined characteristics comprise information on a person's face.

Preferably, the predetermined relationship between the first range and the second range comprises a positional relationship.

Preferably, the predetermined relationship between the first range and the second range comprises an area ratio.

To attain the second object, in an eleventh aspect of the present invention, there is provided a program for causing a computer to execute an image processing method of performing a type of image processing selected from among a plurality of types of image processing, on an image, comprising a display module for displaying the image on a screen, a range designating module for designating a first range on the displayed image, a range detecting module for detecting at least one second range having predetermined characteristics on the displayed image from the displayed image, and a processing type selecting module for selecting at least one type of image processing to be performed on the displayed image from among the plurality of types of image processing according to a predetermined relationship between the first range and the second range.

To attain the second object, in a twelfth aspect of the present invention, there is provided a computer-readable storage medium storing the program.

The above and other objects, features, and advantages of the present invention will become apparent from the following detailed description taken in conjunction with the accompanying drawings.

BRIEF DESCRIPTION OF THE DRAWINGS

FIG. 28 is a view showing a memory map of a storage medium according to a fourth embodiment of the present invention;

DETAILED DESCRIPTION OF THE PREFERRED EMBODIMENTS

The present invention will now be described in detail below with reference to the drawings showing preferred embodiments thereof.

Figure 1:
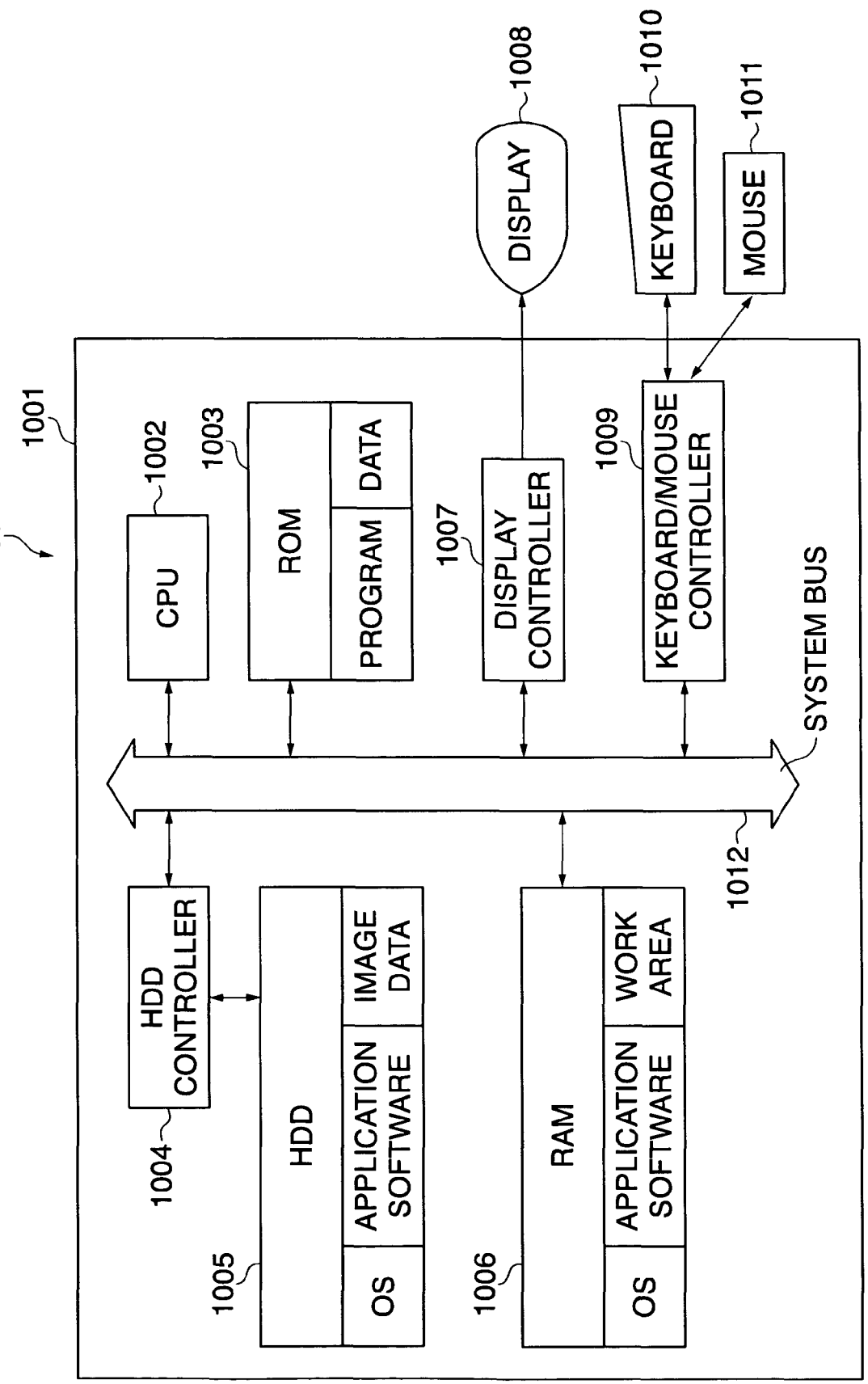
FIG. 1 is a block diagram schematically showing the hardware configuration of an image processing apparatus according to a first embodiment of the present invention.

FIG. 1 is a block diagram schematically showing the hardware configuration of an image processing apparatus according to a first embodiment of the present invention.

As shown in FIG. 1, the image processing apparatus 1000 according to the first embodiment is implemented by a personal computer and is comprised of an image processing apparatus main body 1001, a CPU 1002 that controls component parts of the image processing apparatus main body 1001, a ROM 1003, a hard disk drive (HDD) 1005, a HDD controller that controls access to the HDD 1005, a RAM 1006, a display 1008 for displaying characters and images, a display controller 1007 that controls the display 1008, a keyboard 1010, a mouse 1011 as a pointing device, a keyboard/mouse controller 1009 that receives predetermined inputs from the user via the keyboard 1010 and the mouse 1011, and a system bus 1012. The system bus 1012 is for connecting the CPU 1002, ROM 1003, RAM 1006, and controllers 1004, 1007, and 1009 to each other.

The CPU 1002, ROM 1003, RAM 1006, and controllers 1004, 1007, and 1009 are provided within the image processing apparatus main body 1001.

Image editing application software (hereinafter referred to as "the image editing application"), described later, is installed in the image processing apparatus 1000. The installation of the image editing application is carried out only once insofar as there is no particular reason. The image processing apparatus 1000 executes the image editing application to function as the image processing apparatus which performs image processing in FIG. 3, described later, on an image.

There are a plurality of types of image processing; e.g. a type that predetermined image editing processing such as beautiful skin processing is performed on an image displayed in an image data display range 2001 (image display area), described later, in accordance with information on an image in an editing area, described later, and a type that predetermined image editing processing such as spot removal processing is performed on an image in the editing area in accordance with information on an image outside the editing area.

In the above-mentioned beautiful skin processing, an image including a person is corrected so that the person's skin can look beautiful. Specifically, in the beautiful skin processing, a skin-color area of an image in the editing area is acquired as information on the skin of a person, and in accordance with the acquired information on the person's skin, smoothing processing is performed on an image area corresponding to the person's face skin in an image displayed in the image data display range 2001. In the above-mentioned spot removal processing, an image including a person is corrected by a color replacing process so that the person's spots and the like disappear. Specifically, in the spot removal processing, the color replacing process is carried out in which an image outside the editing area, and more particularly, the color of an image around the editing area is acquired as information on a person's skin color including no spots or the like, and the color of an image inside the editing area is replaced by the acquired person's skin color.

Figure 3:
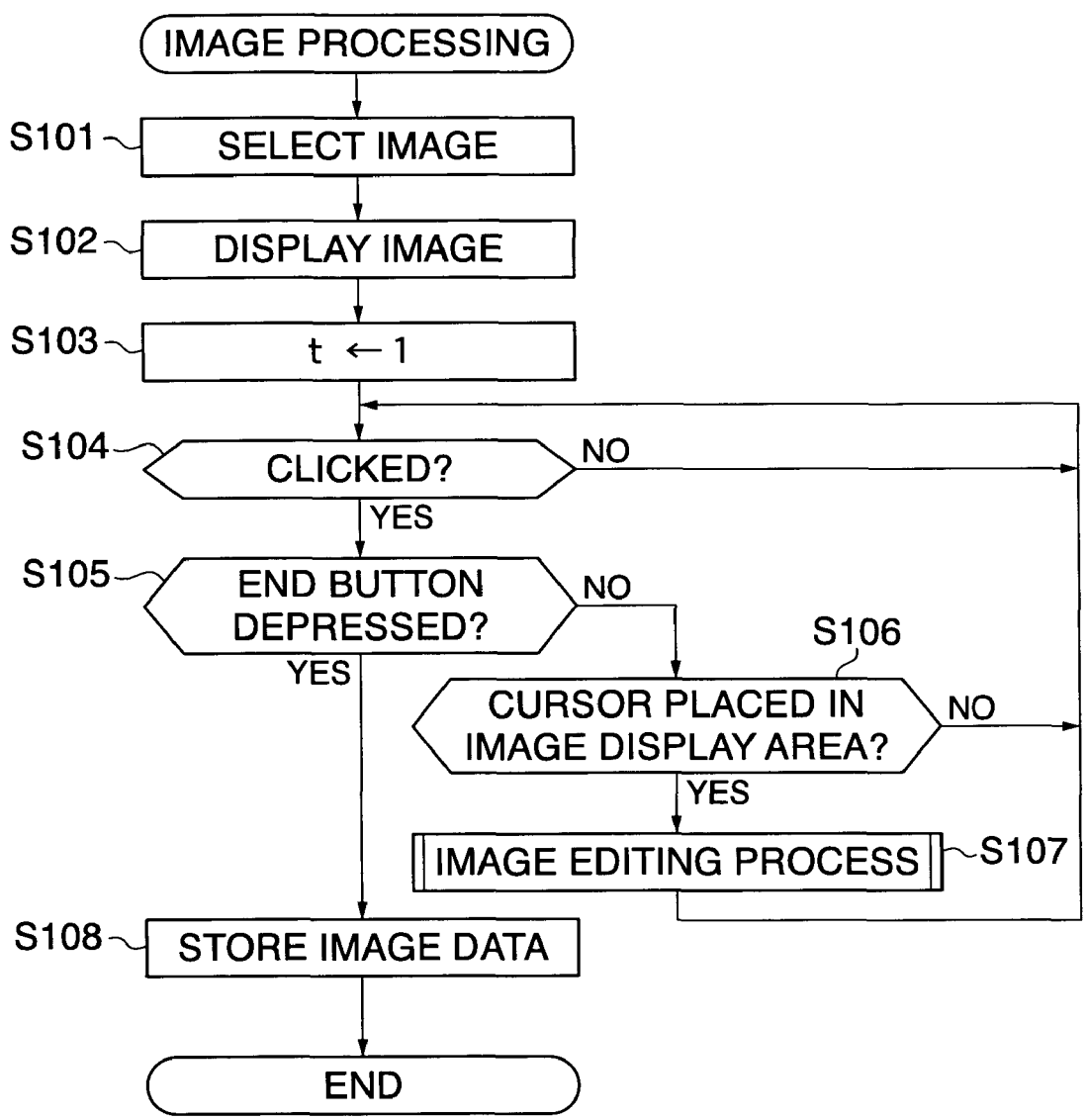
FIG. 3 is a flow chart showing image processing carried out by the image processing apparatus in FIG. 1.

The HDD 1005 stores an OS (Operating System) on which the image processing apparatus 1000 operates, application software including the installed image editing application, and image data corresponding to images to which image processing in FIG. 3 is to be performed using the image editing application.

A work area for the CPU 1002 to execute various kinds of software is reserved in the RAM 1006. The ROM 1003 stores a program for loading the OS from the HDD 1005 into the RAM 1006 and starting the same so that the CPU 1002 can control the controllers 1004, 1007, and 1009, and data for use in executing the program.

The CPU 1002 controls component parts provided inside the image processing apparatus main body 1001 via the system bus 1012 and a bridge, not shown. The CPU 102 loads the OS and the application software stored in the HDD 1005 into the RAM 1006 via the HDD controller 104 to execute the program stored in the ROM 1003 and the OS and the application software stored in the RAM 1006.

The display 1008, keyboard 1010, and mouse 1011 are user interfaces (UIs) for providing interface so that the user can proceed predetermined processes interactively with the image processing apparatus 1000. The display controller 1007 controls the display 1008 under the control of the CPU 1002. The display 1008 displays an image editing screen in FIG. 2, described later. The keyboard/mouser controller 1009 receives inputs from the user via the keyboard 1010 and the mouse 1011 under the control of the CPU 1002.

Figure 2:
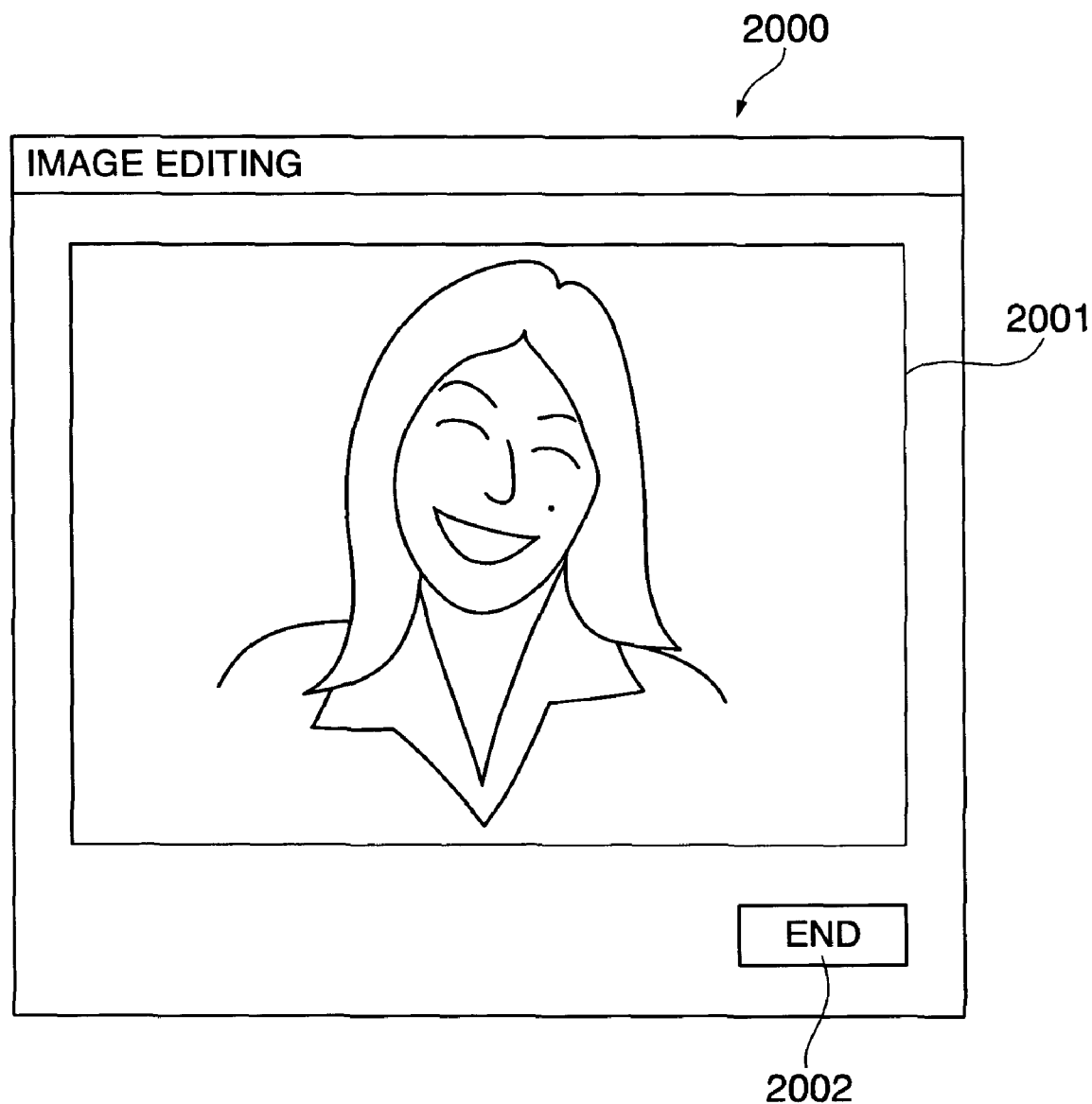
FIG. 2 is a view showing an example of the layout of an image editing screen displayed on a display in FIG. 1.

FIG. 2 is a view showing an example of the layout of the image editing screen displayed on the display 1008 in FIG. 1.

The image editing screen 2000 in FIG. 2 is comprised of an image data display range 2001 that is provided in the central part, for defining a range where an image on which image processing in FIG. 3, described later, is to be performed is displayed, and an end button 2002 that is provided at the bottom, for terminating image processing in FIG. 3, described later.

In response to execution of the image editing application, the image processing apparatus 1000 displays the image editing screen 2000, defines an editing area whose predetermined range and shape thereof have been defined in the image data display range 2001 via a user's input via the mouse 1011, and performs image processing on at least part of the image displayed in the image data display range 2001 according to information on the image in the defined editing area or the image outside the defined editing area. It should be noted that the at least part of the image is determined according to the type of image editing processing.

When the user positions the cursor of the mouse 1011 on the end button 2022 and clicks a button of the mouse 1011 (hereinafter referred to as "the mouse button"), i.e. when the user depresses the end button 2022, the image editing application is quit. When the end button 2022 is depressed, image data corresponding to the image at least part of which has been subjected to image processing is stored in the HDD 1005.

FIG. 3 is a flow chart showing image processing carried out by the image processing apparatus 1000 in FIG. 1. The image processing is carried out in accordance with the image editing application loaded from the HDD 1005 into the RAM 1006.

As shown in FIG. 3, first, in a step S101, the user operates the mouse 1011, for example, to select an image from among a plurality of images stored in the HDD 1005 via an image selecting screen, not shown, displayed on the display 1008. Upon receiving the selection, the image processing apparatus 1000 reads image data corresponding to the selected image from the HDD 1005 into the work area of the RAM 1006 to display the read image data on the image data display range 2001 of the image editing screen 2000 as shown in FIG. 2 (step S102).

Then, in a step S103, a value "1" as a default value is stored as (set to) the value of a variable t that represents the type of a predetermined image editing process among a plurality of types of image editing processes that can be carried out by the image editing application.

It should be noted that either a "1" or a value "2" is used as the variable t. The value "1" of the variable t corresponds to the above-mentioned beautiful skin processing, and the value "2" of the variable t corresponds to the above-mentioned spot removal processing.

Then, it is determined whether or not the user has depressed (clicked) the mouse button (step S104). The image processing apparatus 1000 waits for the click, and when the mouse button is clicked (YES to the step S104), the process proceeds to a step S105 wherein coordinates that indicate the position of the cursor of the mouse 1011 on the image editing screen 2000 are acquired, and whether the acquired coordinates are located in the area of the end button 2002 is determined so as to determine whether or not the end button 2002 has been depressed.

If it is determined in the step S105 that the end button 2002 has not been depressed, it is determined whether or not the coordinates indicating the cursor position lie in the image data display range 2001 (step S106). If it is determined in the step S106 that the coordinates lie in the image data display range 2001, the process proceeds to a step S107 wherein an image editing process in FIGS. 4A and 4B, described later, and the process then returns to the step S104. On the other hand, if the coordinates do not lie in the image data display range 2001, the process returns to the step S104 with the step S107 being skipped. It is configured such that when the coordinates do not lie in the image data display range 2001 or the end button 2002, the click by the user is ignored.

On the other hand, if it is determined in the step S105 that the acquired coordinates lie in the area of the end button 2002, the process proceeds to a step S108 wherein a storing process is carried out in which image data corresponding to the image displayed in the image data display range 2001 of the image editing screen 2000 on the display 1008 is stored in the HDD 1005, followed by terminating the process.

According to the process of FIG. 3, since the value "1" is stored as the default value of the variable t (step S103), an image editing process of the type corresponding to the value "1" of the variable t can be easily repeatedly carried out, resulting in improvement of user friendliness.

It should be noted in the step S103, the default value "2" of the variable t may be stored, or the value of the variable t corresponding to the type of image editing process carried out in the previous image process may be stored.

Figure 4A:
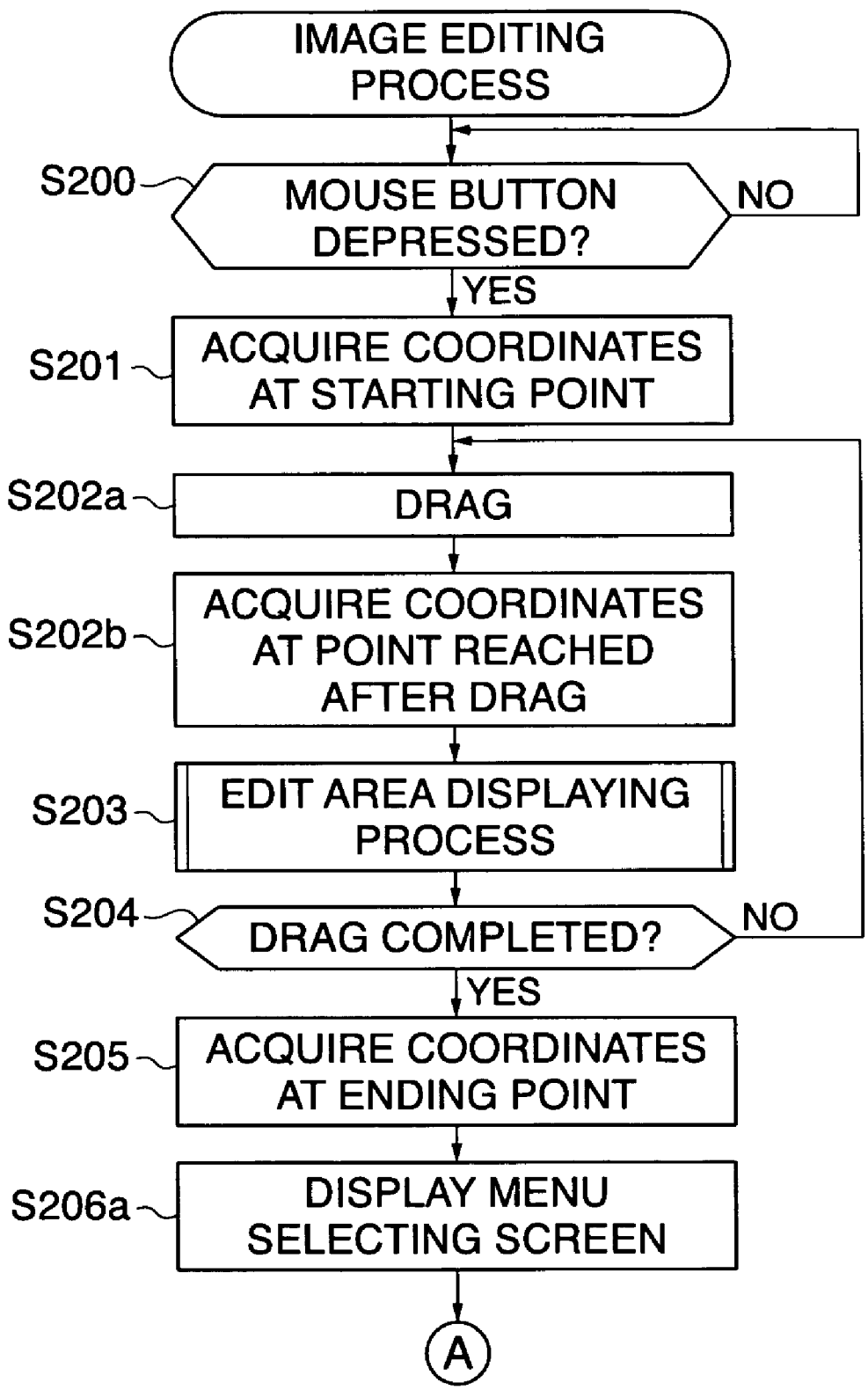
FIG. 4A is a flow chart showing an image editing process carried out in a step S107 in FIG. 3.
Figure 4B:
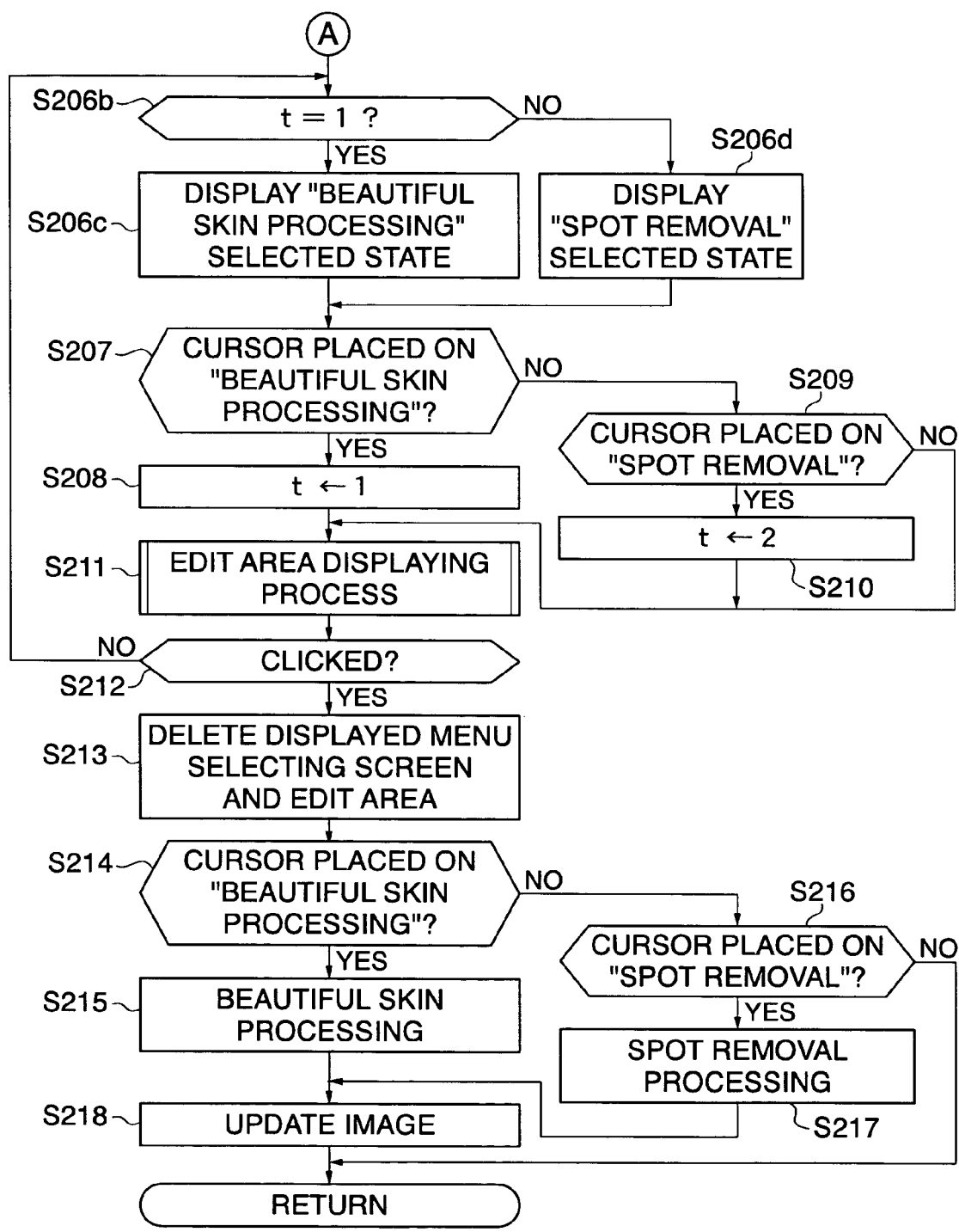
FIG. 4B is a flow chart showing a continued part of FIG. 4A.

FIGS. 4A and 4B are flow charts showing the image editing process carried out in the step S107 in FIG. 3.

As shown in FIGS. 4A and 4B, first, it is awaited that the user depresses the mouse button so as to designate one point in the image data display range 2001 using the cursor of the mouse 1011 (step S104 in FIG. 3). When the mouse button is depressed (YES to a step S200), coordinates in the image display range 2001 which indicate the cursor position of the mouse 1011 at a time point the mouse button was depressed are acquired (step S201). In the RAM 1006, the acquired coordinates are recorded as coordinates indicating a starting point of cursor movement caused by a dragging operation, described later.

Figure 8:
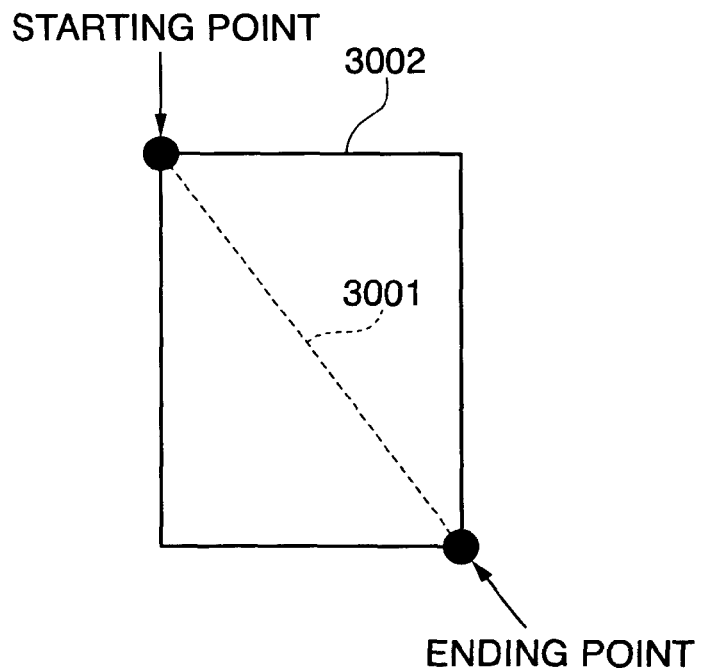
FIG. 8 is a view showing the arrangement of a rectangular frame displayed in a step S302 in FIG. 7.
Figure 9:
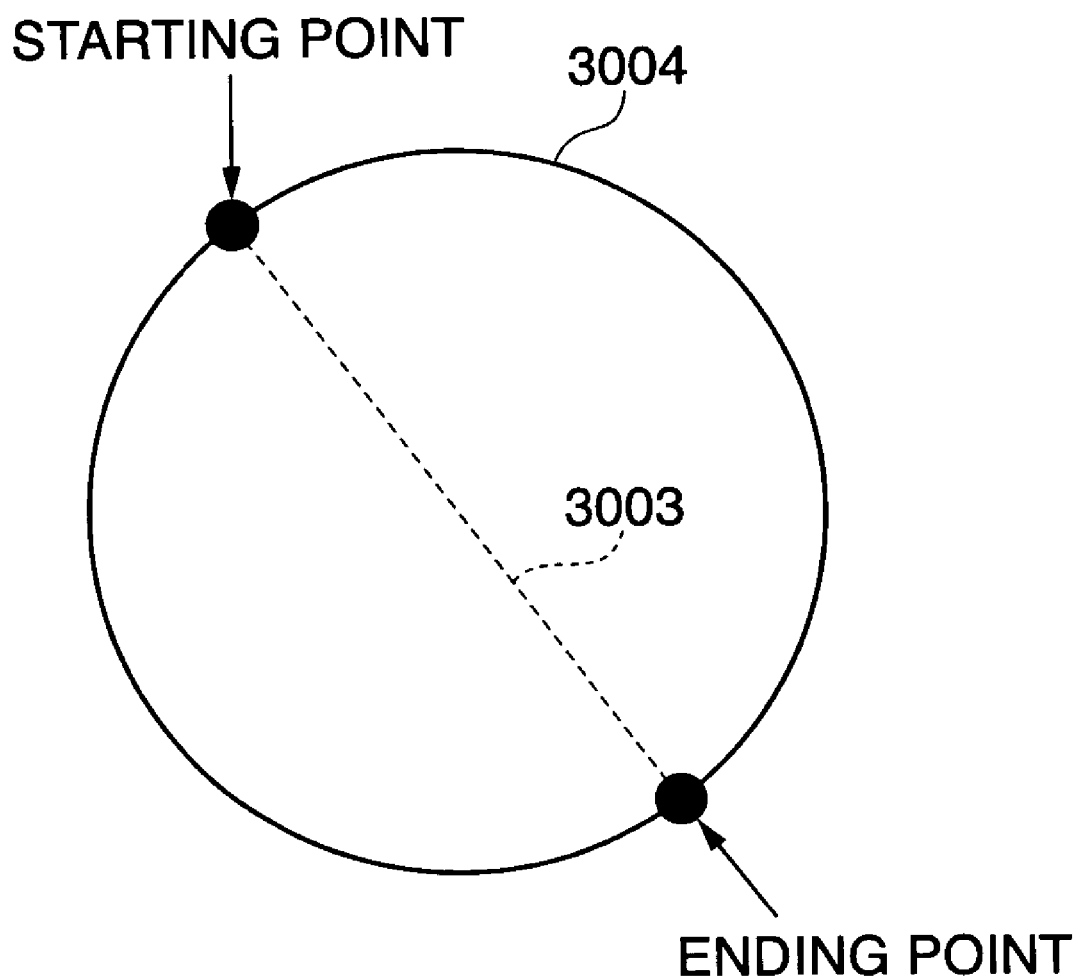
FIG. 9 is a view showing the arrangement of a circular frame displayed in a step S303 in FIG. 7.

Next, in a step S202a, a moving operation (dragging operation) is performed in which the mouse 1011 is moved with the mouse button being continuously depressed by the user. The image processing apparatus 1000 acquires coordinates in the image display area 2001, which indicate an ending point of cursor movement after the mouse 1011 has been moved by the dragging operation (step S202b) to carry out an editing area displaying process in FIG. 7, described later, in which an editing area as shown in FIGS. 8 and 9, described later, is drawn (displayed) (step S203). It should be noted that the range and shape of the editing area are defined based on the coordinates acquired in the step S201, the coordinates acquired in the step S202b or a step S205, described later, and the value of the variable t stored in the step S103 in FIG. 3 or a step S208 or 210, described later.

Then, in a step S204, it is determined whether or not the user has stopped continuing to depress the mouse button (dragging operation). If it is determined in the step S204 that the dragging operation has been stopped, i.e. if the mouse button is still being depressed, the process returns to the step S202a so that the steps S202a to S204 are executed again to follow the dragging operation performed by the user. On the other hand, if it is determined in the step S204 that the dragging operation has been stopped, the process proceeds to the step S205 wherein coordinates indicating the position of an ending point of cursor movement at a time point the dragging operation was stopped are acquired and recorded in the RAM 1006.

Figure 5:
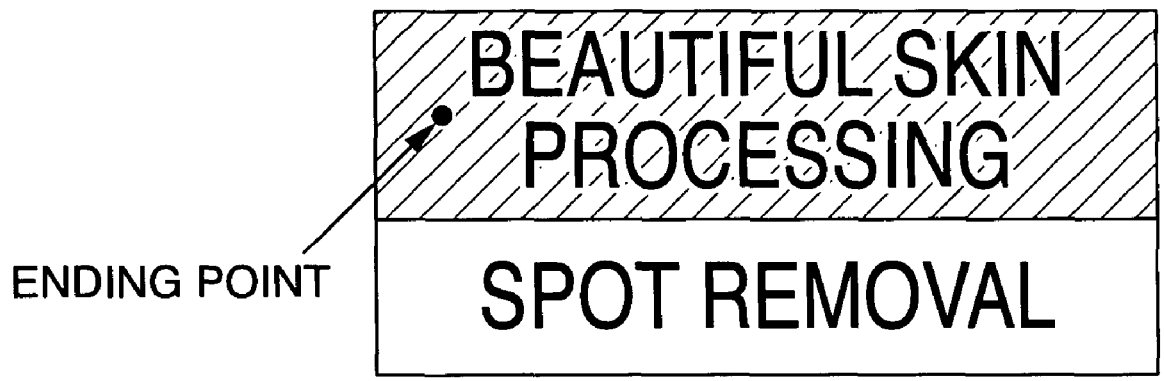
FIG. 5 is a view showing an example of a menu selecting screen displayed in a step S206a in FIG. 4A.
Figure 6:
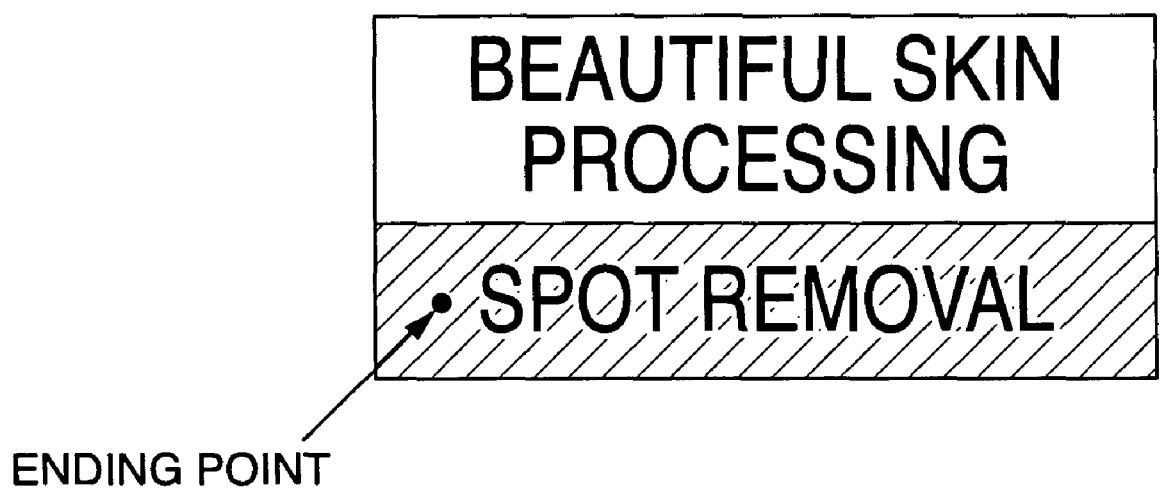
FIG. 6 is a view showing another example of the menu selecting screen displayed in the step S206a in FIG. 4A.

Then, in a step S206a, a menu selecting screen as shown in FIG. 5 or 6, described later, is popped up in the vicinity of the ending point acquired in the step S205. It should be noted that on the menu selecting screen, "beautiful skin processing" and "spot removal" are displayed as menu items of image editing process.

On this occasion, if the value of the variable t indicating the type of image editing process is "1" (YES to a step S206b), the popped-up menu selecting screen is such that as shown in FIG. 5, an area where the menu item "beautiful skin processing" is displayed lies in an area including the ending point, the cursor is displayed in the area where the menu item "beautiful skin processing" is displayed, and the menu item "beautiful skin processing" is selected (step S206c). On the other hand, if the value of the variable t is "2" (NO to the step S206b), the popped-up menu screen is such that an area where the menu item "spot removal" is displayed lies in an area including the ending point, the cursor is displayed in the area where the menu item "spot removal" is displayed, and the menu item "spot removal" is selected (step S206d).

Next, in a step S207, it is determined whether or not the cursor is placed in the area where the menu item "beautiful skin processing" is displayed. If the cursor is placed in the area where the menu item "beautiful skin processing" is displayed, the process proceeds to the step S208 wherein the value "1" as a value corresponding to the beautiful skin processing is set to the value of the variable t, and the process then proceeds to a step S211. On the other hand, if the cursor is not placed in the area where the menu item "beautiful skin processing" is displayed (NO to the step S207), it is determined whether or not the cursor lies in the area where the menu item "spot removal" is displayed (step S209).

If it is determined in the step S209 that the cursor lies in the area where the menu item "spot removal" is displayed, i.e. if the cursor has moved to the area where the menu item "spot removal" is displayed as a result of operation of the mouse 1011 by the user from the state in which the cursor lies in the area where the menu item "beautiful skin processing" is displayed in the step S206c, or if the menu item "spot removal" is selected in the step S206d, the process proceeds to the step S210 wherein the value "2" as a value corresponding to the spot removal processing is set to the value of the variable t. It should be noted that in the step S206d, when the cursor has moved to the area where the menu item "beautiful skin processing" is displayed as a result of operation of the mouse 1011 by the user from the state in which the cursor lies in the area where the menu item "spot removal" is displayed (YES to the step S207), the process proceeds to the step S211 via the steps S208.

It should be noted that if it is determined in the steps S207 and S209 that the cursor does not lie in the area where the menu item "beautiful skin processing" is displayed nor in the area where the menu item "spot removal" is displayed, the process proceeds to the step S211 without changing the value of the variable t. In this case, the menu selecting screen is displayed such that neither the menu item "beautiful skin processing" nor the menu item "spot removal" is selected.

In the next step S211, as is the case with the step S203, the editing area displaying process in FIG. 7, described later, is carried out. Then, the process proceeds to the step S212 wherein it is determined whether or not the mouse button has been clicked by the user. If it is determined in the step S212 that the mouse button has not been clicked, the process returns to the step S206b, so that in the steps S206b to S211, the menu item selecting process is carried out again by the user. On the other hand, if it is determined in the step S212 that the mouse button has been clicked by the user, the process proceeds to a step S213 wherein the menu selecting screen displayed in the step S216a and the editing area displayed in the step S211 are deleted.

Then, in a step S214, it is determined whether or not the cursor is placed in the area where the menu item "beautiful skin processing" was displayed on the menu selecting screen deleted in the step S213. If it is determined that the cursor is placed in the area where the menu item "beautiful skin processing" was displayed, the process proceeds to a step S215 wherein the above described beautiful skin processing is performed to update the image displayed in the image data display range 2001 on the display 1008 to an image on which the beautiful skin processing has been performed (step S218), followed by termination of the process.

If it is determined in the step S214 that the cursor does not lie in the area where the menu item "beautiful skin processing" was displayed, the process proceeds to a step S216 wherein it is determined whether or not the cursor lies in the area where the menu item "spot removal" was displayed. If it is determined in the step S216 that the cursor lies in the area where the menu item "spot removal" was displayed, the process proceeds to a step S217 wherein the above described spot removal processing is performed. Then, the image displayed in the image data display range 2001 on the display 1008 is updated to an image on which the spot removal processing has been performed (step S218), followed by termination of the process.

If it is determined in the step S216 that the cursor does not lie in the area where the menu item "spot removal" was displayed, i.e. if the cursor lies outside the area where the menu selecting screen was displayed, it is determined that the user has cancelled designation of the editing area. Then, the process is terminated with the image editing process in the step S215 or S217 and the image updating process in the step S218 skipped.

According to the process of FIGS. 4A and 4B, the menu selecting screen is popped up at the ending point or in the vicinity thereof (step S206a), and according to the value of the variable t, when the cursor lies at the ending point or in the vicinity thereof, a menu item corresponding to a desired type of image editing process is displayed in an area including the ending point, so that the menu item is selected (step S206c or S206d). As a result, it is possible to minimize the distance the mouse 1011 is moved by the user after designation of the ending point (step S205) and to smoothly select the type of image editing process, improving user friendliness.

Also, after confirming the editing area on the display 1008, if the user would like to change the range of the editing area and the position of the starting point or the ending point, he/she can easily cancel designation of the editing area and re-designate the editing area by simply moving the cursor onto an area outside the menu selecting screen and then clicking the mouse button.

In a variation of the process in FIGS. 4A and 4B, it may be configured such that a value corresponding to the type of image editing process carried out on the last occasion is set to the variable t. As a result, the operation of the mouse 1011 required for the user to repeatedly carry out an image editing process of the same type can be substantially minimized to the dragging operation intended to designate the editing area, thus further improving user friendliness.

Figure 7:
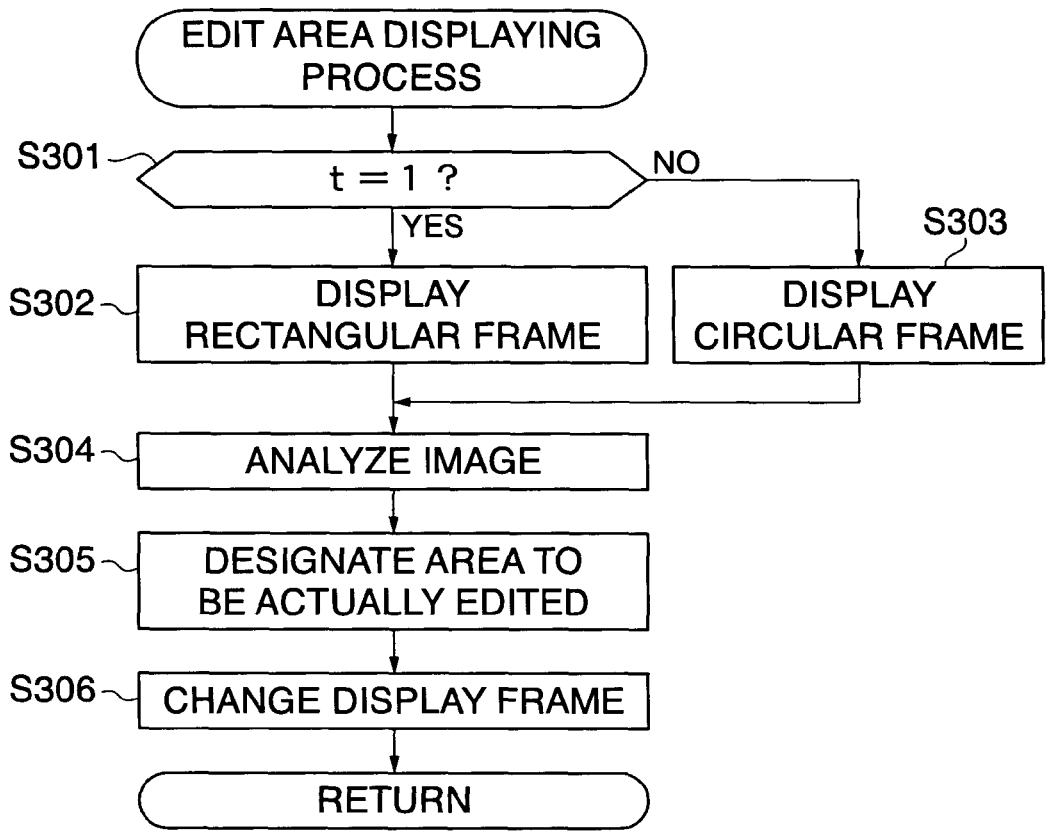
FIG. 7 is a flow chart sowing an editing area displaying process carried out in a step S203 in FIG. 4A and a step S211 in FIG. 4B.

FIG. 7 is a flow chart showing the editing area displaying process carried out in the step S203 in FIG. 4A or in the step S211 in FIG. 4B.

As shown in FIG. 7, first, in a step S301, it is determined whether or not the value of the variable t is "1". If the value of the variable t is "1", the process proceeds to a step S302, and on the other hand, if the value of the variable t is "2", the process proceeds to a step S303, described later.

In the next step S302, the user is prompted to designate a temporary area including an area where the beautiful skin processing is desired to be performed, while a rectangular area is displayed. For example, a rectangular frame 3002 as shown in FIG. 8 is displayed as the temporary area, in which a diagonal line 3001 connects the starting point designated in the step S201 in FIG. 4A and the ending point designated in the step S202b or S205. Then, the image in the temporary area designated by the user or the image over the whole area is analyzed (step S304), and an area to be actually edited is identified in the temporary area designated by the user or its vicinity (step S305). For example, after the user designates a circular frame which defines an area where a spot is to be removed, as the temporary area, image analysis is carried out to identify an area that is to be actually subjected to the spot removal processing, inside the circular frame. Then, to cause the user to recognize the area to be actually processed, the shape of the displayed frame itself is changed, or a frame other than the displayed frame is displayed, or the color of an area outside the identified area to be actually image-processed is changed so that the user can easily recognize the identified area (step S306). Then, the process is terminated. It should be noted that the area to be actually edited, which is identified in the step S305, should not necessarily be inside the rectangular frame 3002, but may extend beyond the temporary area designated by the user.

For example, there may be a case where after the user designates a temporary area that covers substantially the whole area of a face but does not cover the ears or the like, an area including the ears or the like is defined in the step S305 as an area on which the beautiful skin processing is to be actually performed. In this case, the temporary area designated by way of the rectangular frame 3002 as shown in FIG. 8 is changed to a frame having a shape of an ellipse, or a shape fitted to the whole area that represents a person's face, in the steps S305 to S306.

Also, in the case where the user designates the temporary area by way of a circular frame 3004 as shown in FIG. 9, the circular frame 3004 is changed to a frame having a shape indicative of a minute area where a spot has been found according to the result of the image analysis in the step S304.

The image analysis in the step S304 may be carried out in timing after the temporary area is designated by the user, or for example, an image over the whole area may be analyzed in advance. It should be noted that in the case where analyzing the whole of a large image in advance imposes a heavy burden on a computer, it is preferred that after the user designates the temporary area, image analysis is carried out in accordance with the menu item selected by the selecting process of the steps S206b to S211.

Figure 10:
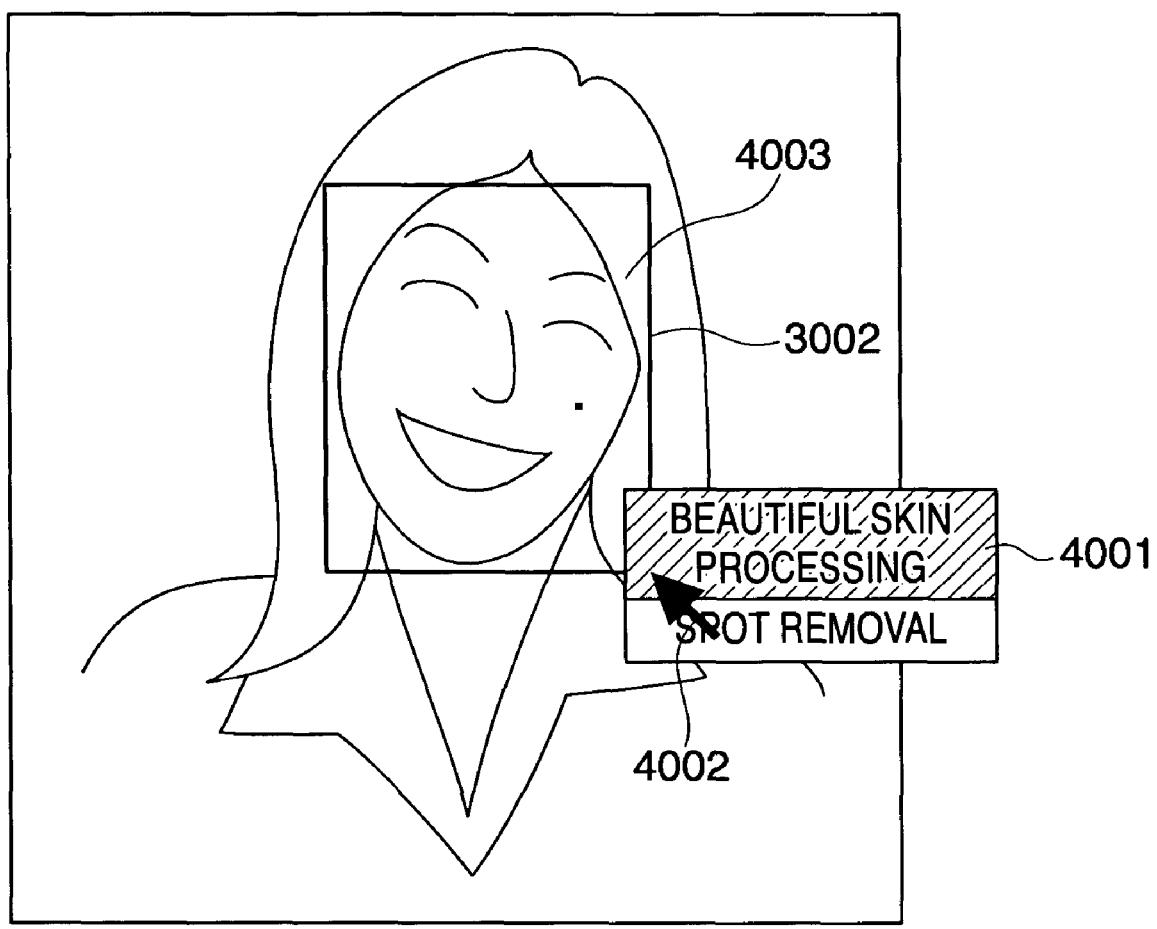
FIG. 10 is a view showing an image editing screen displayed when an editing area is defined by the rectangular frame in FIG. 8.

For example, on an image editing screen in FIG. 10, a cursor 4002 of the mouse 1011 is moved onto an area 4001 where the menu item "beautiful skin processing" is displayed on the menu selecting screen, so that an editing area 4003 with the range thereof defined by the rectangular frame 3002 suitable for designating a range including the whole face of a person can be easily confirmed.

Also, in the step S303, an editing area suitable for the "spot removal" processing, e.g. the circular frame 3004 as shown in FIG. 9 whose diameter is the length of a line 3003 connecting the starting point designated in the step S201 in FIG. 4A to the ending point designated in the step S202b or S205 in FIG. 4A is displayed inside the image data display range 2001, and the same processing as in the steps S304 to S306 is performed, followed by termination of the process. It should be noted that the editing area corresponds to an area inside the circular frame 3004 as the temporary area designated by the user.

Figure 11:
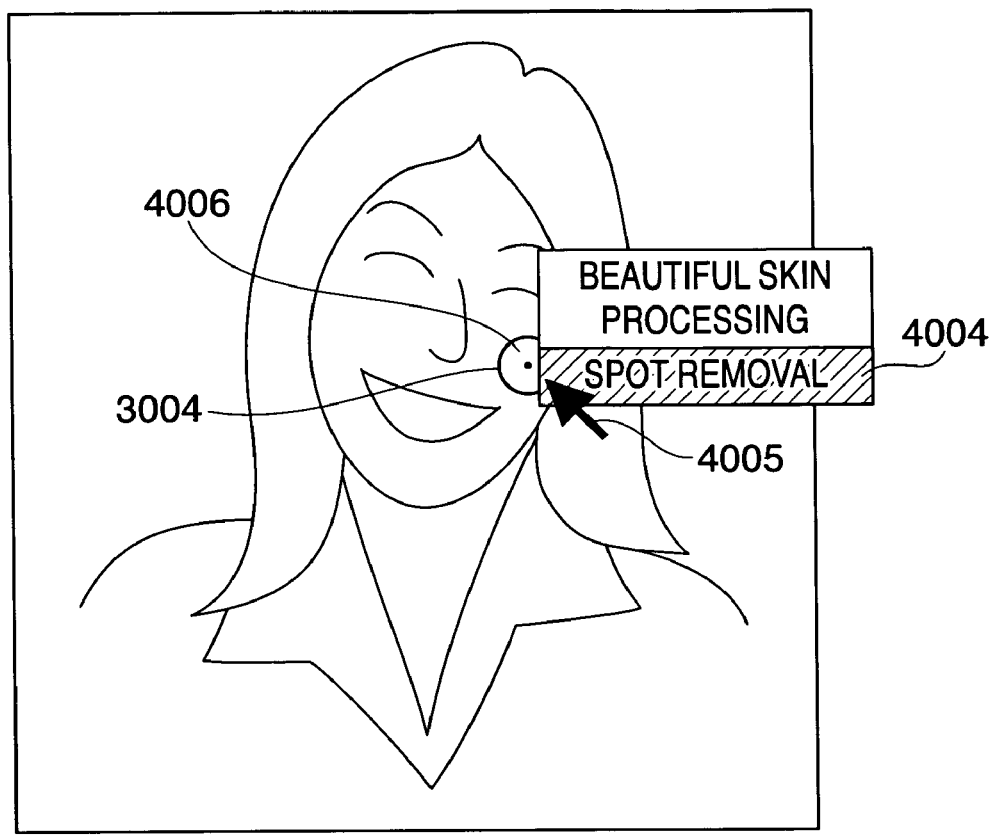
FIG. 11 is a view showing an image editing screen displayed when an editing area is defined by the circular frame in FIG. 9.

For example, on an image editing screen in FIG. 11, a cursor 4005 of the mouse 1011 is moved onto an area 4004 where the menu item "spot removal" is displayed on the menu selecting screen, so that an editing area 4006 with the range thereof defined by the circular frame 3004 suitable for designating a range including a spot-like image can be easily confirmed.

According to the process of FIG. 7, a frame having a shape suitable for the type of image editing process (beautiful skin processing or spot removal processing) is displayed according to the value of the variable t (s step S302 or S303), and hence the user can easily see the editing area and does not have to set in advance the shape of a frame that defines the editing area. Therefore, user friendliness can be improved.

According to the processes of FIGS. 3, 4A, 4B, and 7, after the starting point and the ending point of an editing area are designated by carrying out the dragging operation, a shape that defines the range of the editing area can be automatically set by carrying out a common operation in which the type of image editing process is designated on the menu selecting screen. Therefore, it is possible to cope with a plurality of types of image editing processes by carrying out the common operation independent of the type of image editing process, and as a result, user friendliness can be improved.

Although in the first embodiment described above, there are two types of image processing, i.e. the beautiful skin processing and the spot removal processing, there may be three or more types of image processing. In this case, numeric values which can be set as the variable t and the number of the numeric values are determined in dependence on the number of types of image processing. Also, different variables t may be associated with image processing of the same type so that different shapes of frames defining the editing area can be used even when the image processing of the same type is performed.

Further, although in the first embodiment, the image editing processes are comprised of image correcting processes such as the beautiful skin processing and the spot removal processing, the present invention is not limited to this, but the image editing processes may be any types such as trimming, image rotating, and image inverting. Also, examples of image processing may include a document editing process in which a document is edited.

Although the menu selecting screen displayed in the step S206a in FIG. 4A is configured such that "beautiful skin processing" and "spot removal" are always displayed in this order as selectable menu items (see FIGS. 5, 6, and 10 to 13), the order in which the menu items are displayed may be dynamically changed such that the type of an image editing process carried out last is displayed in the upper part (top) of the menu selecting screen, or the menu items are displayed from the top to the bottom on the menu selecting screen in the order of frequency of usage.

Figure 12:
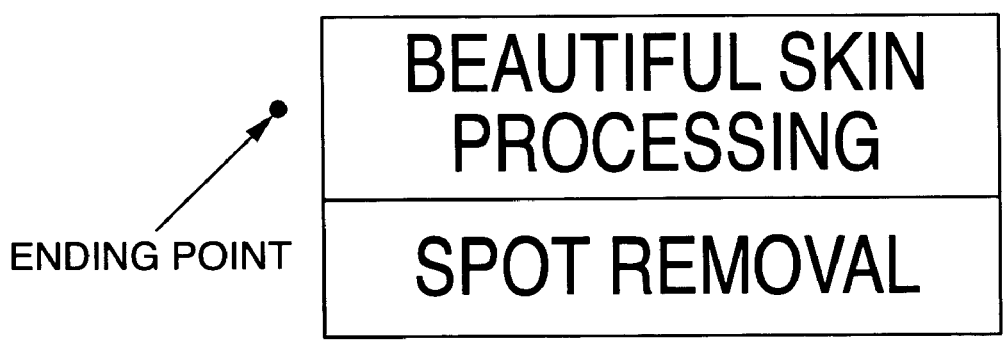
FIG. 12 is a view showing a variation of the display position of the menu selecting screen in FIG. 5.
Figure 13:
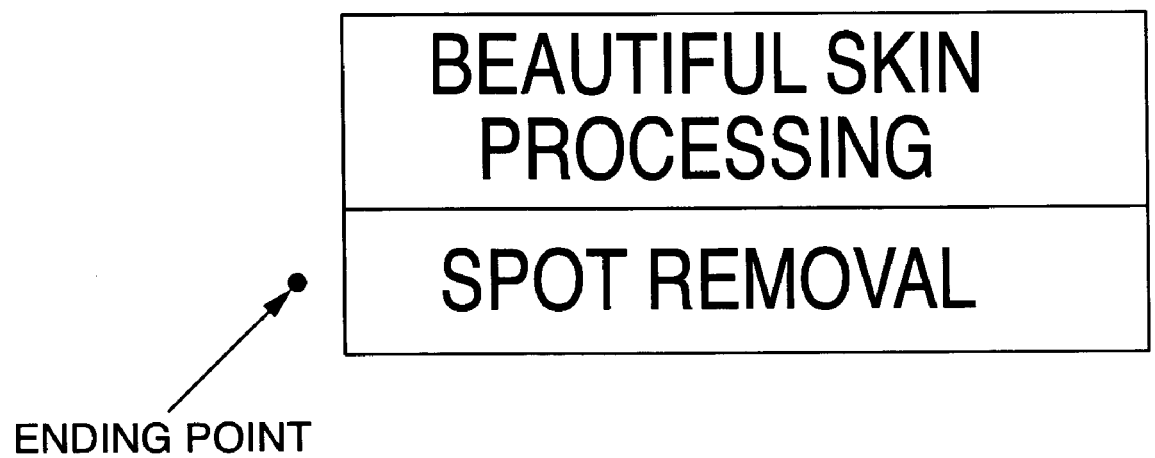
FIG. 13 is a view showing a variation of the display position of the menu selecting screen in FIG. 6.

Further, although in the step S206a in FIG. 4, the menu selecting screen is displayed such that a menu item of image editing processing corresponding to the value of the variable t is displayed at the ending point of the dragging operation or in an area including its vicinity, the present invention is not limited to this, but as shown in FIG. 12 or 13, the menu selecting screen may be displayed such that the area in which the menu selecting screen is displayed does not include at least the ending point of the dragging operation or does not include part of the editing area, and a menu item corresponding to the value of the variable t is positioned in the vicinity of the ending point.

In the above-described first embodiment, if the menu selecting screen cannot be displayed at the ending point of the dragging operation or an area including its vicinity for the reason that e.g. the ending point of the dragging operation is positioned at the outermost edge of the image editing screen on the display 1008, the selecting screen is displayed in another area in the vicinity of the editing area.

Further, in the first embodiment, the editing area is displayed in a format enclosing the editing area with a frame formed of a line, the present invention is not limited to this. For example, the editing area may be displayed in a format in which the color of an image in the editing area is converted into a specific color, or a format in which an image in the editing area is caused to blink, or may be displayed in a combination of these formats.

Figure 14:
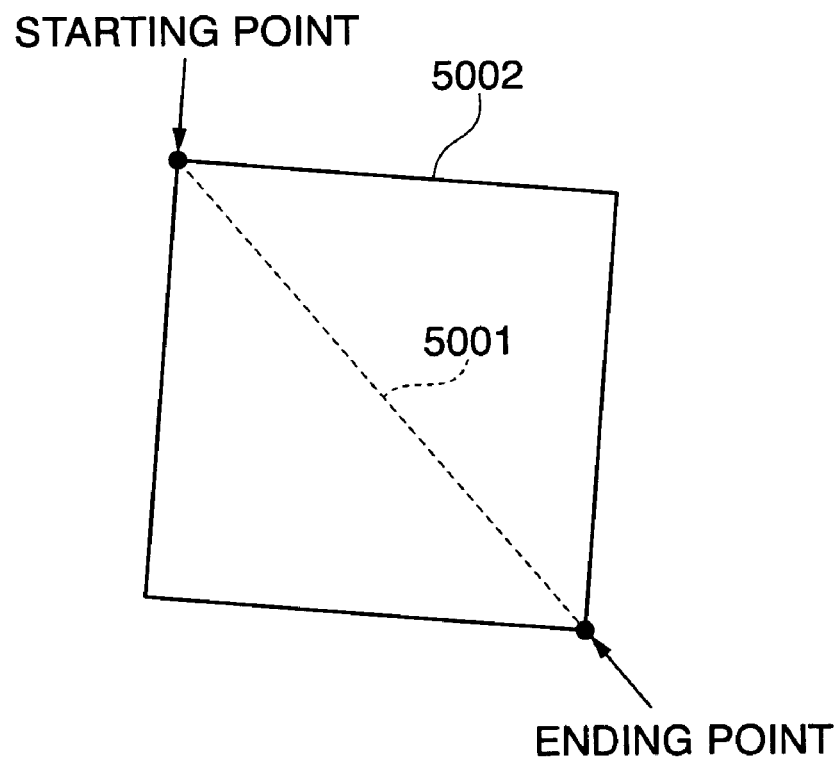
FIG. 14 is a view showing a variation of the rectangular frame in FIG. 8.
Figure 15:
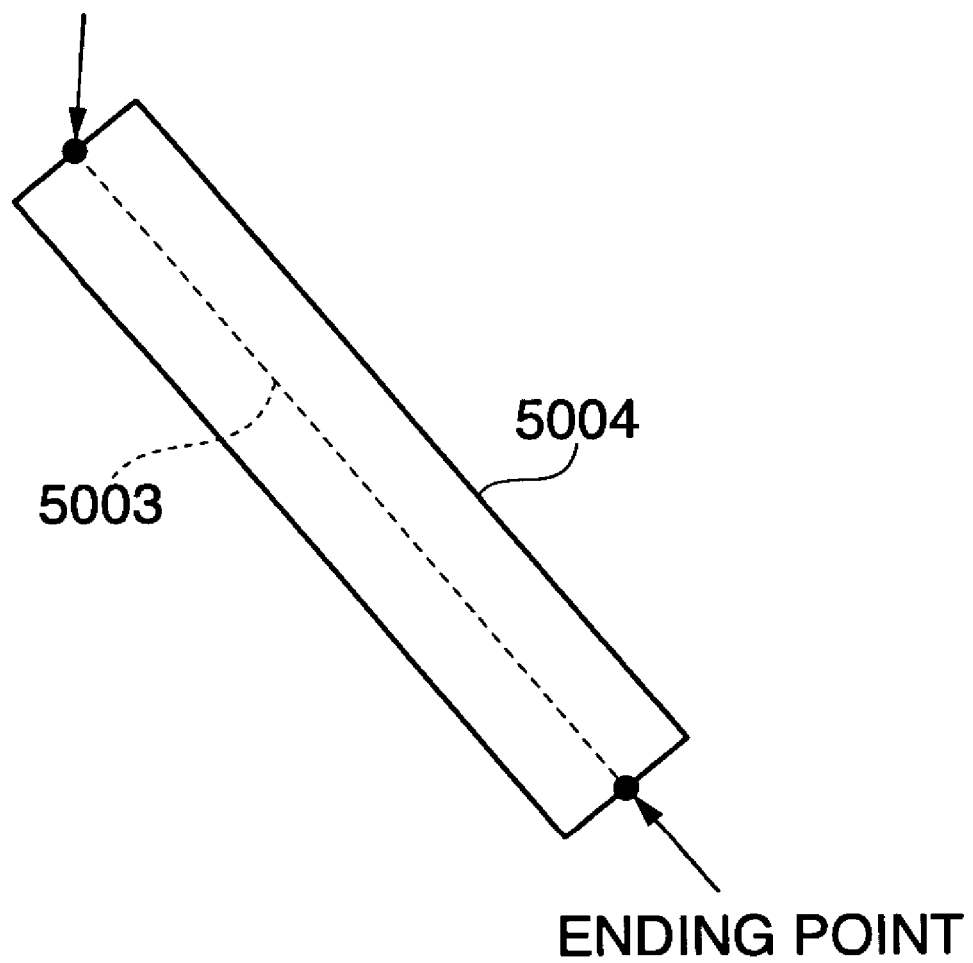
FIG. 15 is a view showing another variation of the rectangular frame in FIG. 8.

Further, in the first embodiment, the rectangular frame 3002 includes a square frame 5002 with a diagonal line 5001 connecting between the starting point and the ending point as shown in FIG. 14. Also, the rectangular frame 3002 may be a rectangular frame 5004 that defines the range in a predetermined width direction with respect to a central line 5003 as shown in FIG. 15.

Further, although in the first embodiment, the starting point and the ending point designated by dragging the mouse 1011 are used to define the editing area, but points other than the starting point and the ending point such as an intermediate point and a plurality of points on a closed curve that is arbitrarily drawn by dragging the mouse 1011 may also be used. Further, the range of the editing area may be defined by a predetermined range with its center being one point designated by clicking the mouse 1011.

A description will now be given of an image processing apparatus according to a second embodiment of the present invention.

The image processing apparatus according to the second embodiment is identical in construction and component elements to the image processing apparatus 1000 according to the above described first embodiment. Therefore, corresponding component elements denoted by identical reference numerals, and duplicate description thereof is omitted; only different points will be described.

Figure 16:
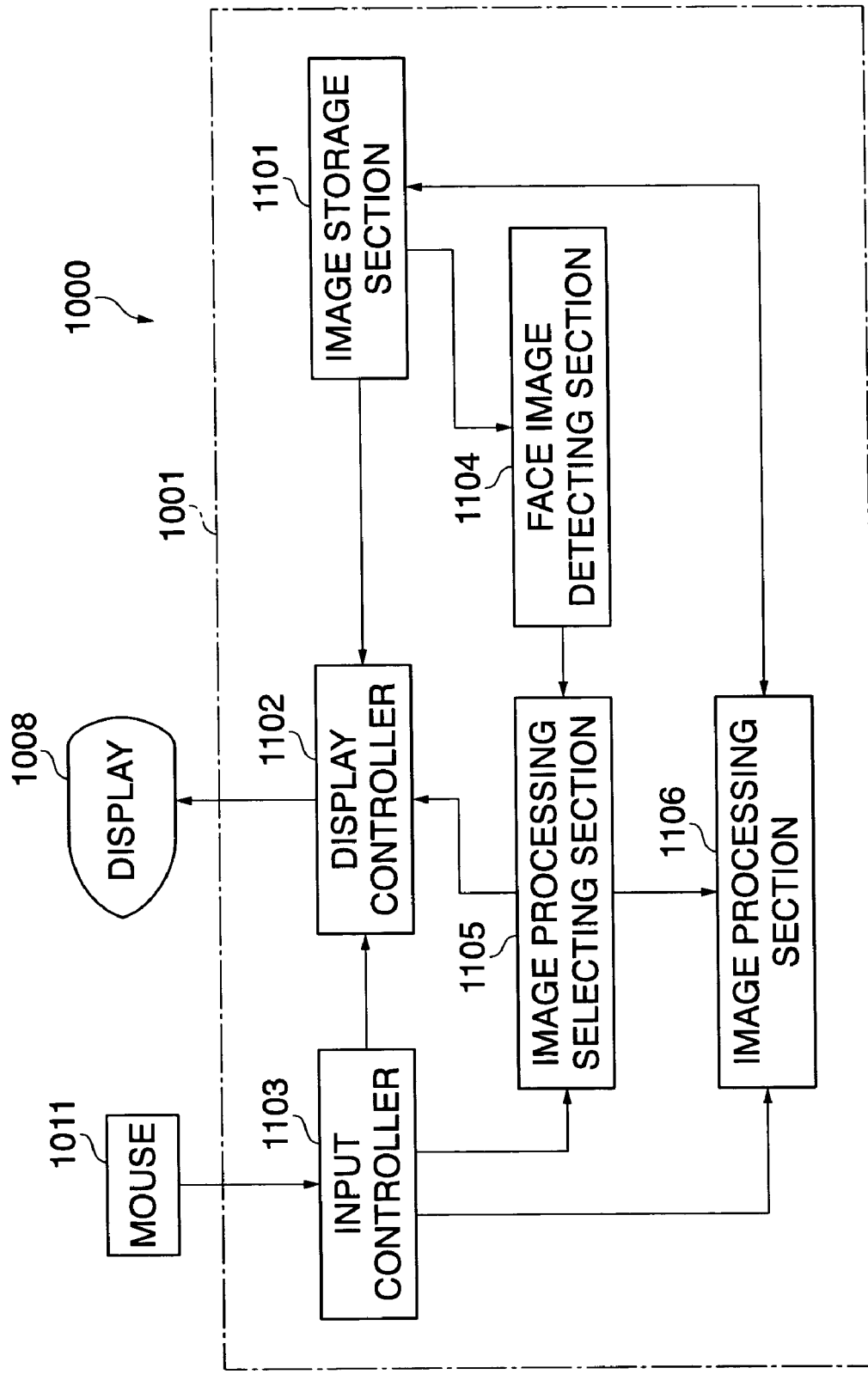
FIG. 16 is a block diagram schematically showing the software configuration of an image processing apparatus according to a second embodiment of the present invention.

FIG. 16 is a block diagram schematically showing the software configuration of the image processing apparatus according to the second embodiment.

Figure 20:
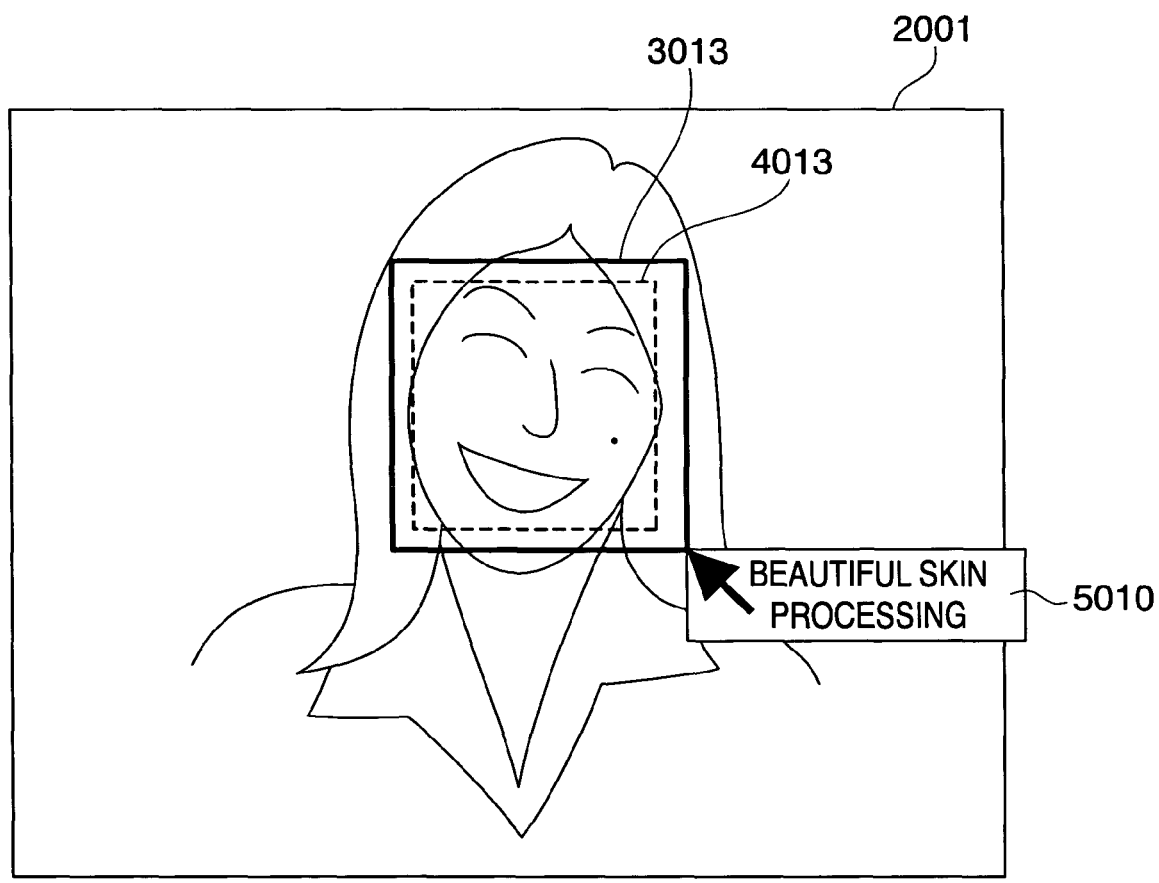
FIG. 20 is a view useful in explaining a user designated range in the case where the type of image processing is "beautiful skin processing"
Figure 21:
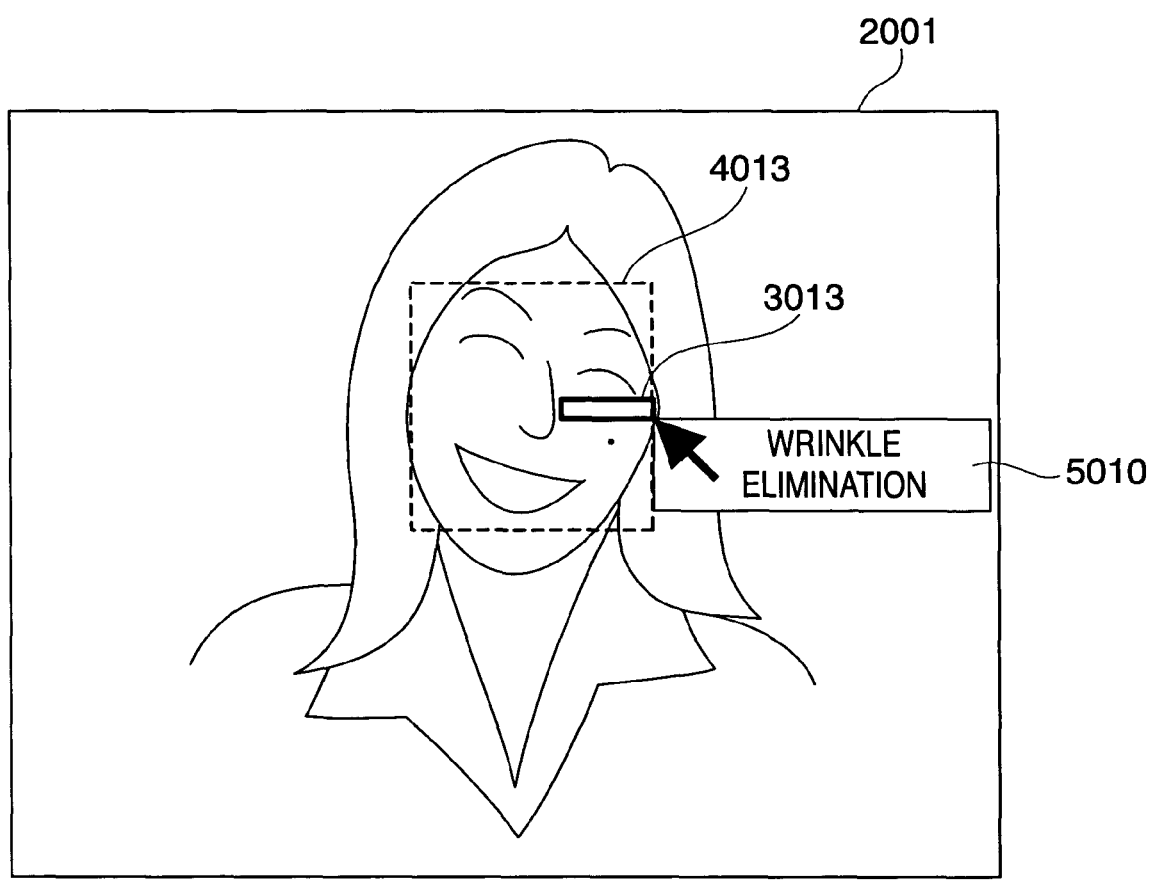
FIG. 21 is a view useful in explaining a user designated range in the case where the type of image processing is "wrinkle elimination"
Figure 22:
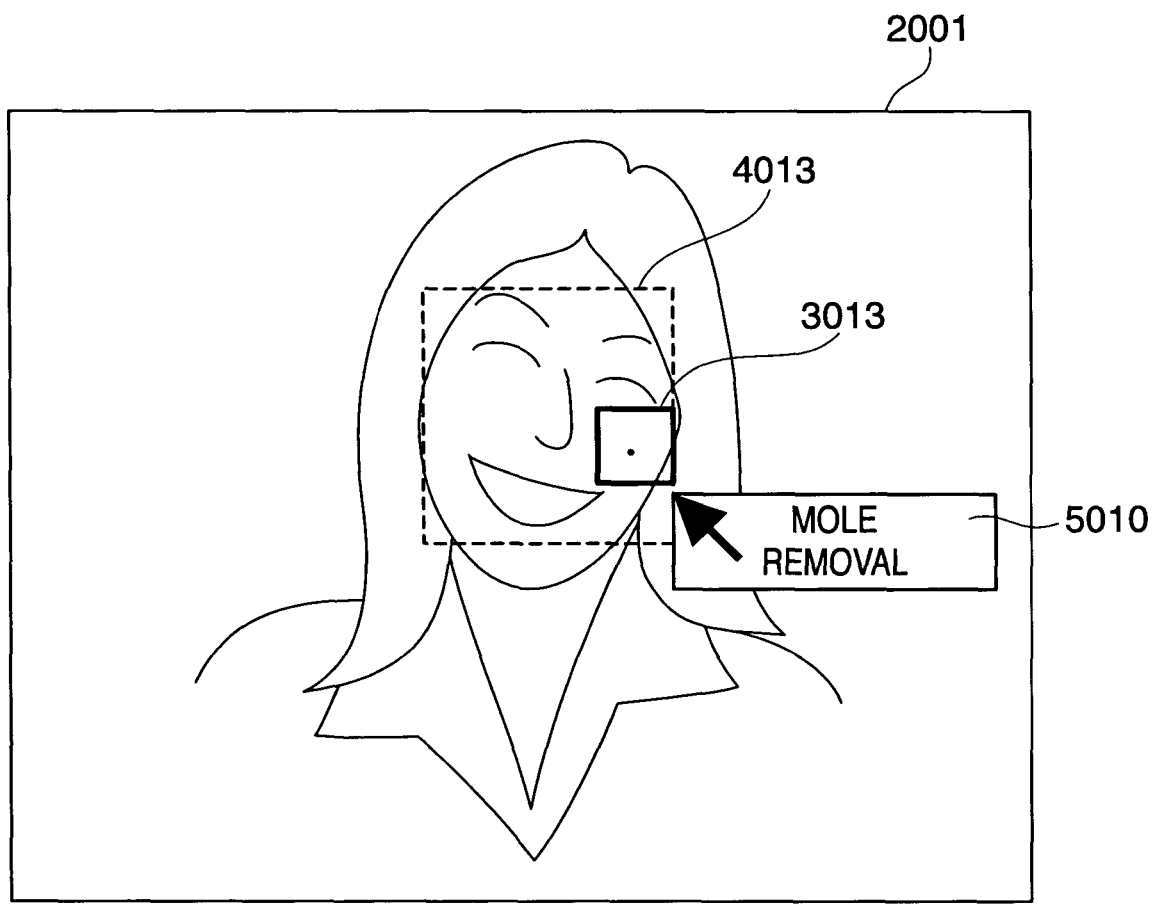
FIG. 22 is a view useful in explaining a user designated range in the case where the type of image processing is "mole removal"

As shown in FIG. 16, the image processing apparatus 1000 according to the present embodiment is comprised of: an image storage section 1101 that stores images to be edited; a display controller 1102 that controls display of an image, a mouse cursor, the image editing screen 2000 as shown in FIG. 2, an execution button 5010 as shown in FIGS. 20 to 22, and so forth on the display 1008; an input controller 1103 that generates mouse cursor coordinate data indicative of the position of a cursor of the mouse 1011 (hereinafter referred to as "the mouse cursor"), data on depression of buttons, and cancellation data on release of depression of the mouse 1011; a face image detecting section 1104 that detects an area corresponding to a person's face, which is included in an image acquired from the image storage section 1101, as a face image area and generates coordinate data on all the coordinates of the face image area; an image processing selecting section 1105 that generates menu information to be displayed for the user as image processing options; and an image processing section 1106 which performs desired image processing on an image stored in the image storage section 1101. It should be noted that the image storage section 1101 corresponds to the RAM 1006 that stores images read from the HDD 1005.

The CPU 1002 executes applications loaded from the HDD 1005 into the RAM 1006 so as to realize functions of the display controller 1102, input controller 1103, face image detecting section 1104, image processing selecting section 1105, and image processing section 1106. Also, during execution of applications for the respective functions, the CPU 1002 stores data, which is to be temporarily recorded, in the work area of the RAM 1006 and refers to the data where needed.

The display controller 1102 controls the display on the display 1008 according to an image input from the image storage section 1101, mouse cursor coordinate data input from the input controller 1103, and menu information input from the image processing selecting section 1105. Any method may be used for the face image detecting section 1104 to detect a face image area; for example, the methods proposed in Japanese Laid-Open Patent Publications (Kokai) Nos. H08-063597, 2001-216515, and 2001-183731, referred to hereinbefore.

The image processing selecting section 1105 generates the menu information based on the mouse cursor coordinate data, data on depression of buttons, and depression release data input from the input controller 1103, as well as data on coordinates of the face image area input from the face image detecting section 1104.

First, the image processing section 1106 determines the type of image processing selected through user's operation on the basis of the mouse cursor data input from the input controller 1103 and the menu information input from the image processing selecting section 1105. Then, the image processing section 1106 acquires an image, on which image processing is to be performed, from the image storage section 1101, performs the image processing of the determined type on the acquired image, and stores the resulting image in the image storage section 1101.

The image processing section 1106 has three types of image processing functions: "beautiful skin processing" in which an image in a face image area 4013, described later, is processed to be smoothed, "wrinkle elimination" in which wrinkles on a person's face is processed to be made less noticeable, and "mole removal" in which spots and moles on a person's face are processed to be made obscure. It should be noted that each type of image processing may be carried out by any method insofar the above-mentioned function can be realized.

A dialogue box, not shown, for selecting an image on which image processing is to be performed is displayed on the display 108. The user operates the keyboard 1010 or the mouse 1011 to select an image on which image processing is to be performed, or an image data name thereof. Image data corresponding to the selected image is read from the HDD 1005 and written into the image storage section 1101 as the work area of the RAM 1006. The display controller 1102 causes the display 1008 to display the image data written in the image storage section 1101 in the image data display range 2001 on the image editing screen 2000 as shown in FIG. 2.

Figure 17:
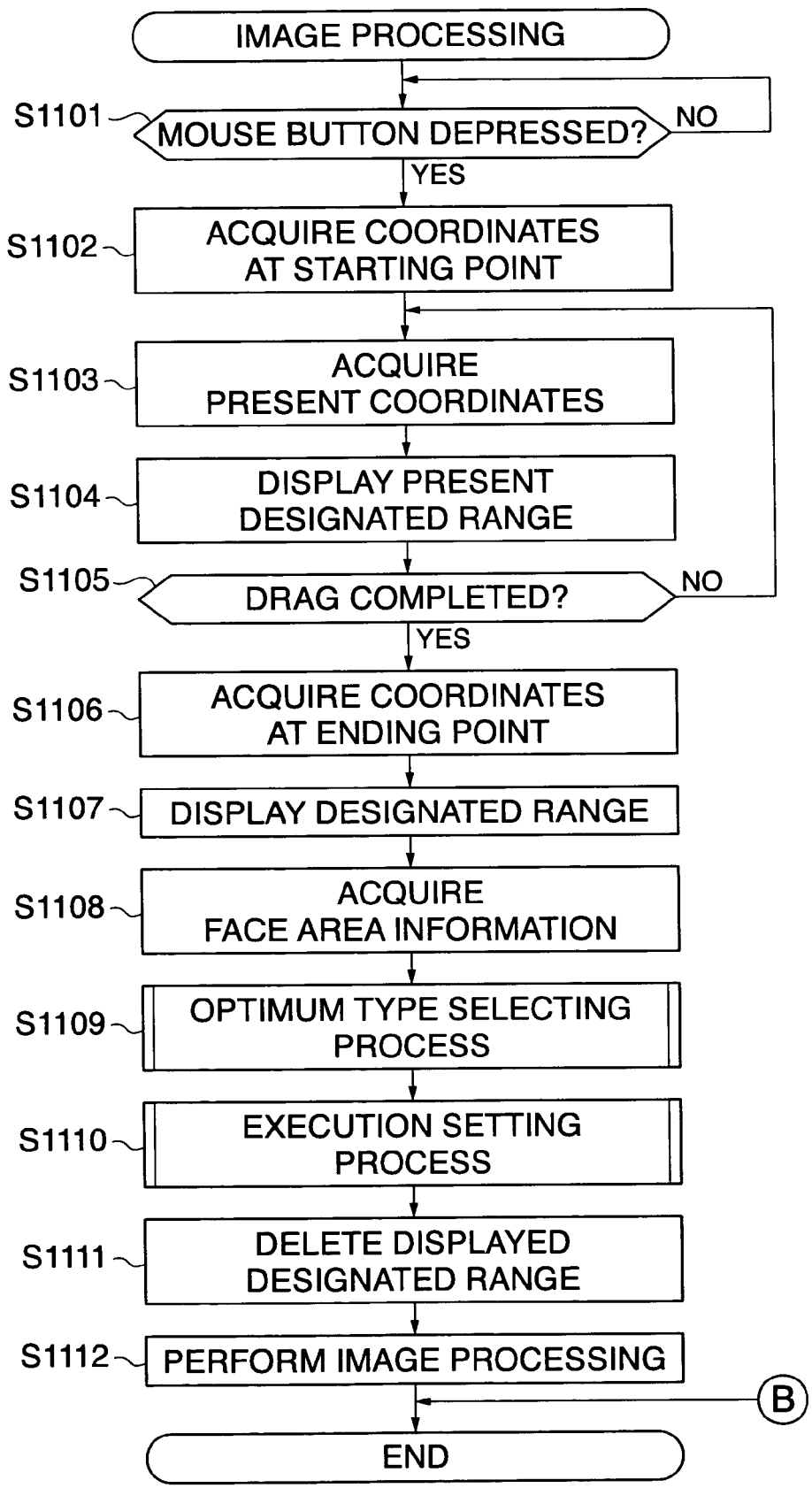
FIG. 17 is a flow chart showing image processing carried out by the image processing apparatus in FIG. 16.

FIG. 17 is a flow chart showing image processing performed by the image processing apparatus 1000 in FIG. 16.

This processing is performed by the CPU 1002 in accordance with an image editing application loaded from the HDD 1005 into the RAM 1006.

As shown in FIG. 17, first, the input controller 1103 waits for depression of the mouse button. Upon depression of the mouse button (YES to a step S1101), data on coordinates of the mouse cursor on the image editing screen 2000 at the present moment is acquired as starting point coordinates 3011 in a user designated range 3013, described later with reference to FIG. 18 (step S1102). Then, the present coordinate data, i.e. coordinate data indicative of the position of the mouse cursor being dragged is acquired (step S1103).

Figure 18:
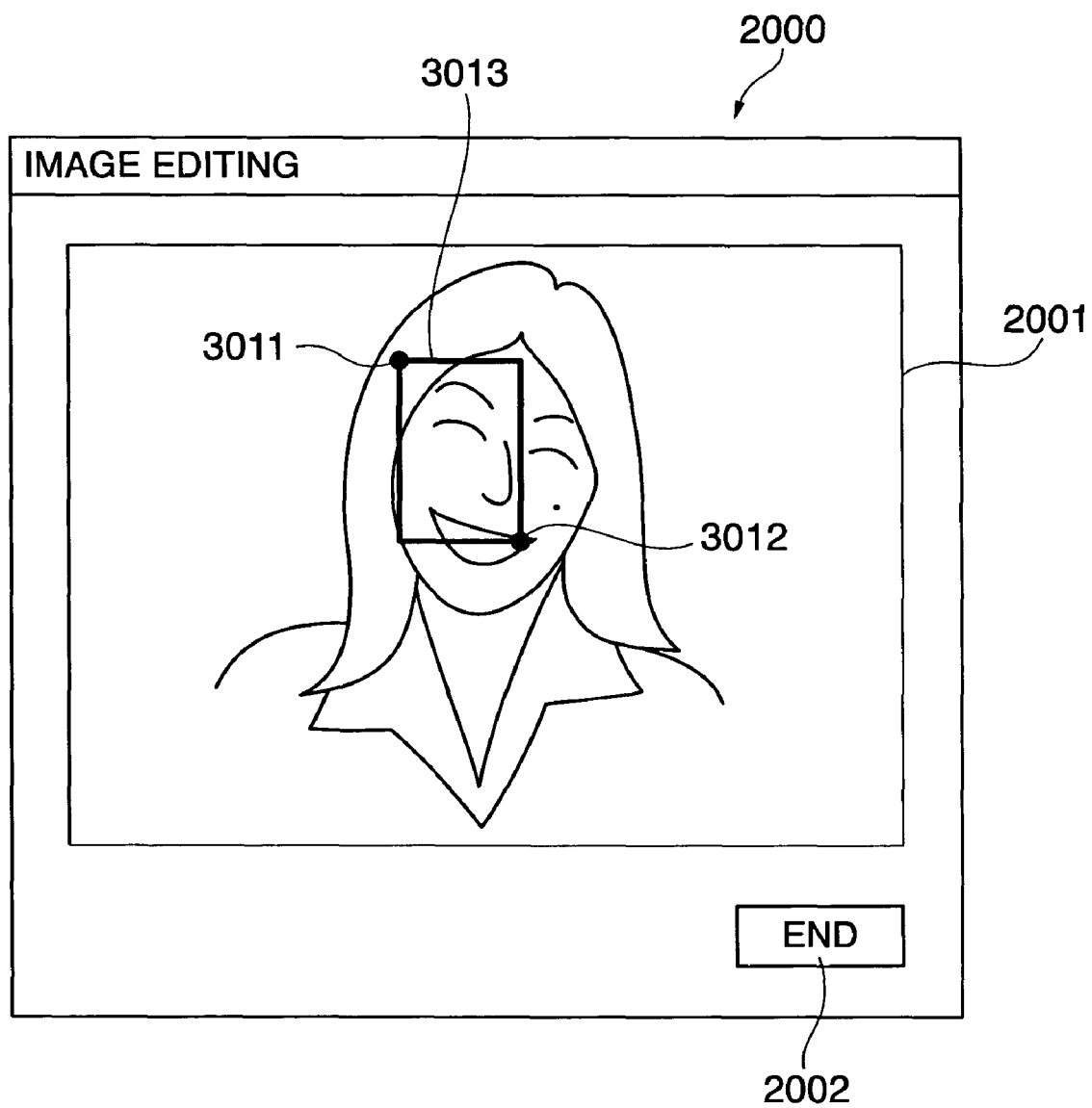
FIG. 18 is a view useful in explaining a user designated range displayed in a manner being superimposed upon the image editing screen in FIG. 2.

In the next step S1104, the display controller 1102 acquires the starting point coordinates 3011 acquired in the step S1102 and the present coordinates acquired in the step S1103 from the input controller 1103. On the basis of them, the display controller 1102 sets a rectangular inside area with a diagonal line thereof connecting between the starting point and the present position as the user designated range 3013 and displays the user designated range 3013 on the display 1008. As shown in FIG. 18, the starting point coordinates 3011 and the rectangular user designated range 3013 set on the basis of the present coordinates 3012 are displayed in a manner being superimposed on the image displayed on the image editing screen 2000, on which image processing is to be performed.

In a step S1105, the input controller 1103 determines whether or not the depression of the mouse button has been stopped (released) to terminate the user's dragging operation. If the mouse button is still being depressed, the process returns to the step S1103, so that the steps S1103 and S1104 are executed again to follow the user's dragging operation. On the other hand, if the dragging operation has been terminated, the process proceeds to a step S1106 wherein the input controller 1103 acquires data on coordinates of the mouse cursor at the time point the dragging operation has been terminated as the present coordinates 3012, i.e. ending point coordinates 3012 of the user designated range 3013.

Then, in a step S1107, the display controller 1102 acquires the starting point coordinates 3011 acquired in the step S1102 and the ending point coordinates 3012 acquired in the step S1106 from the input controller 1103. On the basis of the acquired coordinate data, the display controller 1102 displays a rectangular inside area with a diagonal line thereof connecting between the starting point and the ending point as the user designated range 3013 in a manner being superimposed on the image on which image processing is to be performed.

In a step S1108, the face image detecting section 1104 acquires image data on which image processing is to be performed from the image storage section 1101, detects the face image area 4013 corresponding to the skin (characteristics) of a person's face from the acquired image data, and generates coordinate data (face area information) on all the coordinates of the face image area 4013.

Figure 19:
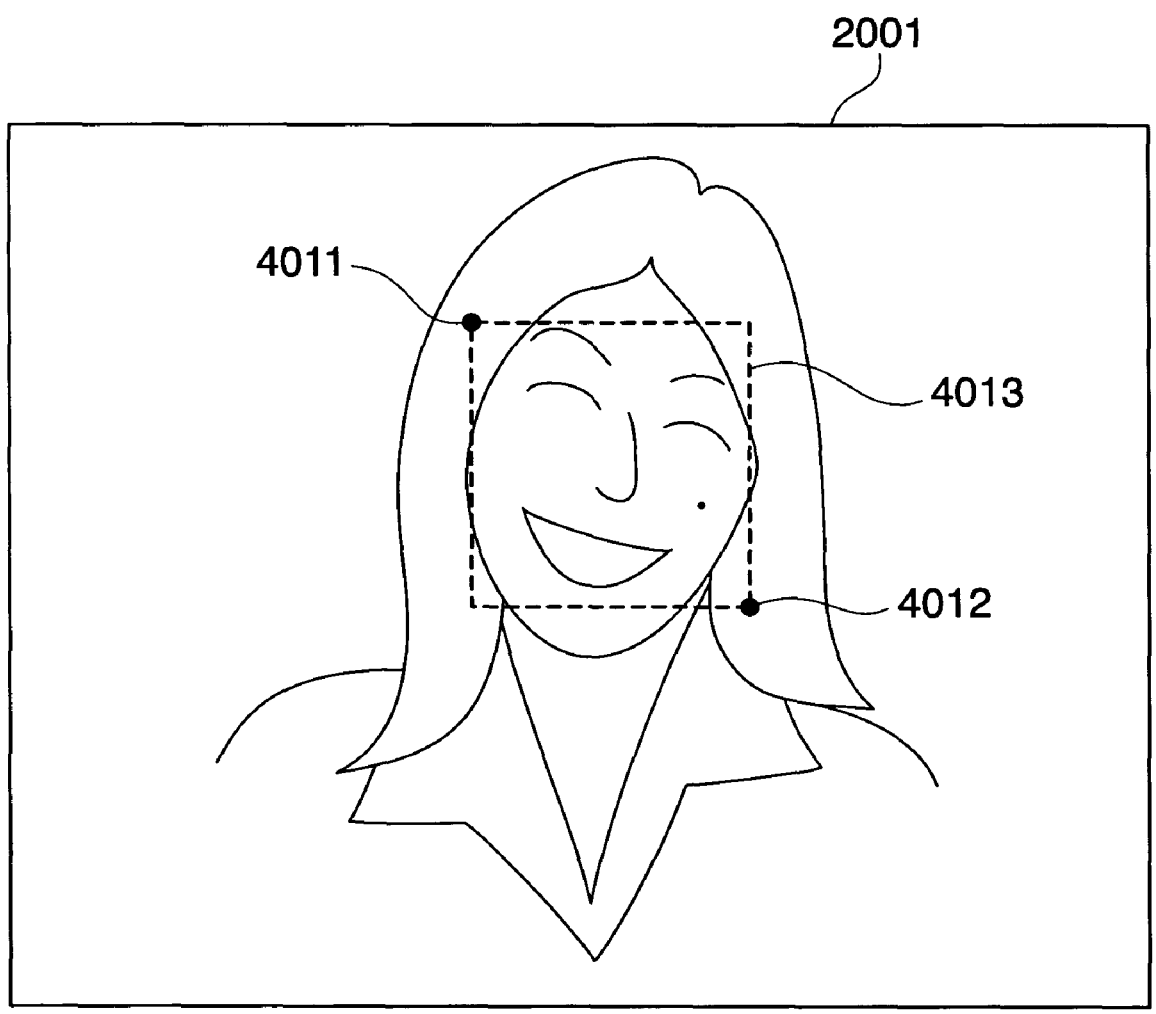
FIG. 19 is a view showing an image data display area on which a face image area detected by a face image detecting section in FIG. 16 is superposed.

FIG. 19 is a view showing the image data display area 2001 on which the face image area 4013 detected by the face image detecting section 1104 in FIG. 16 is superimposed.

As shown in FIG. 19, the shape (e.g. rectangular shape) of the face image area 4013 is defined by an upper left edge 4011 and a lower right edge 4012 thereof. In FIG. 19, only one person's face is displayed in the image data display area 2001, but if a plurality of person's faces are displayed, a plurality of face image areas 4013 indicative of a part corresponding to the skin (characteristics) of all the person's faces are detected to generate a group of coordinate data for the plurality of face image areas 4013.

Referring again to FIG. 17, next, the image processing selecting section 1105 carries out an optimum type selecting process, described later with reference to FIG. 23, to select the optimum type from among the above-mentioned three types of image processing (step S1109), and carries out an execution setting process, described later with reference to FIG. 24, to permit or prohibit execution of the selected optimum type of image processing (step S1110). If the permission to execute the selected optimum type of image processing is set, the display controller 1102 deletes the frame indicative of the user designated range 3013 displayed in the step S1107 and displays the entire image corresponding to the image data stored in the image storage section 1101 on the display 1008 (step S1111). Then, the image processing section 1106 acquires the image data from the image storage section 1101 and executes the selected type of image processing on image data within a range, described later with reference to FIGS. 20 to 22, based on the user designated range 3013 designated based on the starting point coordinates 3011 and the ending point coordinates 3012 acquired in the steps S1102 and S1106 among the acquired image data (step S1112), followed by termination of the process. The image data on which the image processing has been performed in the step S1112 is stored in the image storage section 1101 to update the image data that has been stored in the image storage section 1101 prior to the image processing.

It should be noted that the range where the image processing is executed in the step S1112 is set in advance according to the type of image processing selected in the step S1109.

Specifically, if the selected type is "beautiful skin processing", the user designated range 3013 and the face image area 4013 extending along the periphery of the user designated range 3013 are set as the range where the image processing is to be executed (FIG. 20). If the selected type is "wrinkle elimination", only the inside of the user designated range 3013 is set as the range where the image processing is to be performed (FIG. 21). If the selected type is "mole removal", only the inside of the user designated range 3013 is set as the range where the image processing is to be performed (FIG. 22). In FIGS. 20 to 22, to visualize the face image area 4013 on the display 1008, a rectangular frame indicative of the shape of the face image area 4013 is displayed, but any image processing method may be used insofar as an area corresponding to a person's skin in the face image area 4013 can be visualized. Alternatively, the frame indicative of the face image area 4013 may not be displayed for the user.

It should be noted that the image processing in FIG. 17 is repeatedly performed until the end button 2002 is depressed.

Figure 23:
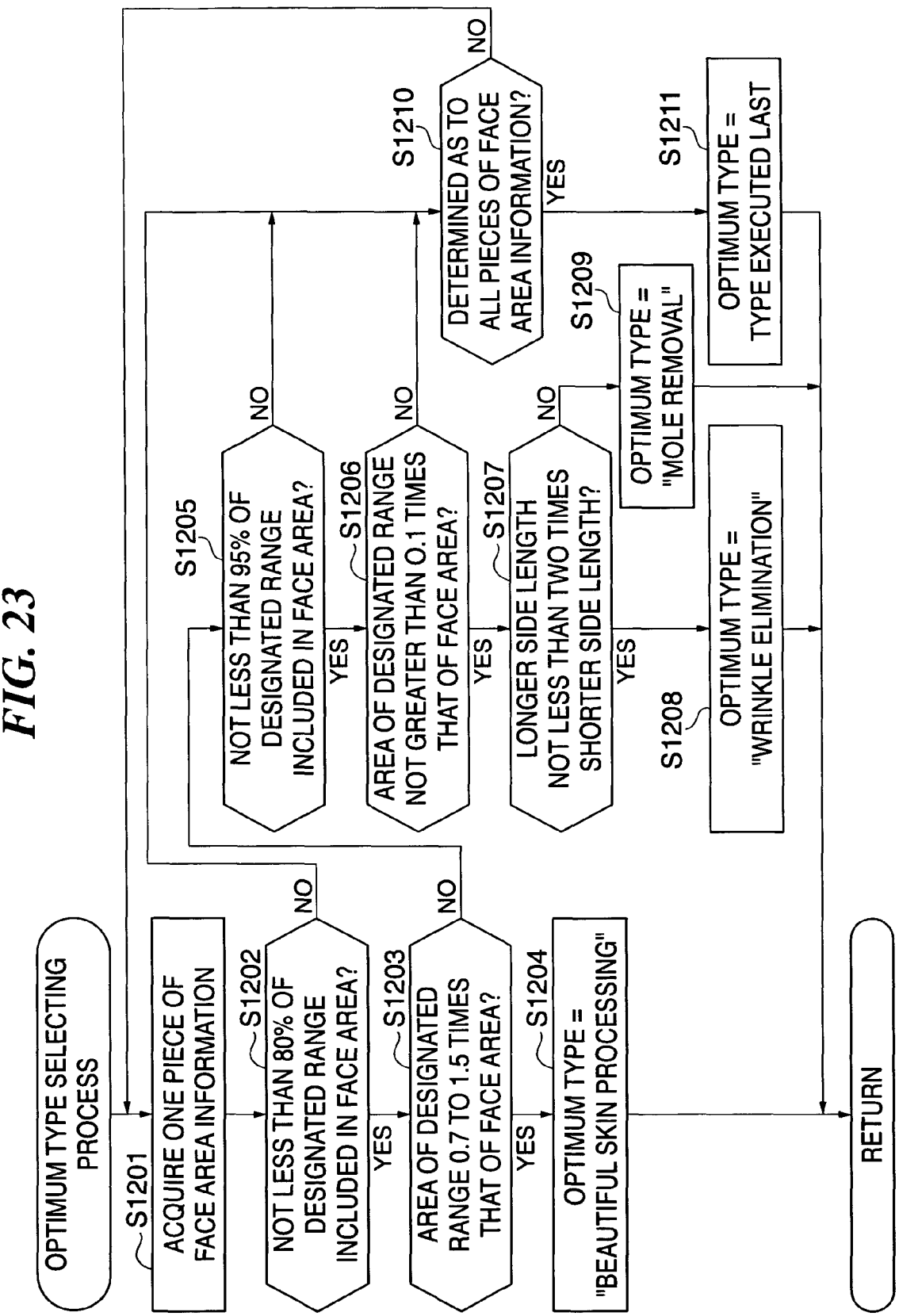
FIG. 23 is a flow chart showing in detail an optimum type selecting process carried out in a step S1109 in FIG. 17.

FIG. 23 is a flow chart showing in detail the optimum type selecting process carried out in the step S1109 in FIG. 17.

In this process, the image processing selecting section 1105 selects the optimum type from among the above-mentioned three types of image processing on the basis of the starting point coordinates 3011 acquired in the step S1102, the ending point coordinates 3012 acquired in the step S1106, and the group of coordinate data corresponding to the at least one face image area 4013 acquired in the step S1108.

As shown in FIG. 23, first, in a step S1201, the starting point coordinates 3011 and the ending point coordinates 3012 of the user designated range 3013 generated by the input controller 1103 are acquired, and coordinate data on the user designated range 3013 defined by the acquired coordinates is acquired. Also, coordinate data on the one face image area 4013 at least overlapping the user designated range 3013 is acquired from the one group of coordinate data on the at least one face image area 4013, generated by the face image detecting section 1104, is acquired. In the next step S1202, the user designated range 3013 and the face image area 4013 at least overlapping the user designated range 3013 are compared in respect of coordinate data with each other to acquire their positional relationship.

If, as a result of the comparison in the step S1202, not less than 80% of the area of the user designated range 3013 is included in the face image area 4013 as shown in FIG. 20 for example (YES to the step S1202), the user designated range 3013 and the face image area 4013 are compared in respect of area with each other to acquire the area ratio (step S1203). If, as a result of the comparison, the area of the user designated range 3013 is 0.7 to 1.5 times as large as the area of the face image area 4013 (YES to the step S1203), "beautiful skin processing" is selected as the optimum type from among the above-mentioned three types of image processing (step S1204). Specifically, if most of the user designated range 3013 overlaps the face image area 4013 and the user designated range 3013 is substantially equal in area to the face image area 4013, image processing such as "beautiful skin processing" that is performed on the entire face is selected. The process is then terminated.

If, as a result of the comparison in the step S1203, the area of the user designated range 3013 is not 0.7 to 1.5 times as large as the area of the face image area 4013 (NO to the step S1203), it is then determined whether or not less than 95% of the area of the user designated range 3013 is included in the face image area 4013 (step S1205). If not less than 95% of the area of the user designated range 3013 is included in the face image area 4013, it is then determined whether or not the area of the user designated range 3013 is not greater than 0.1 times as large as the area of the face image area 4013 (step S1206). If the area of the user designated range 3013 is not greater than 0.1 times as large as the area of the face image area 4013, it is then determined whether or not the length of the longer side of the user designated range 3013 is not less than two times as long as the length of the shorter side (step S1207). If the length of the longer side of the user designated range 3013 is not less than two times as long as the length of the shorter side as shown in FIG. 21 for example, "wrinkle elimination" is selected as the optimum type from among the above-mentioned three types of image processing (step S1208). Specifically, if substantially the whole area of the user designated range 3013 overlaps the face image area 4013, the user designated range 3013 is much smaller than the face image area 4013, and at the same time the user designated range 3013 has a rectangular shape with a large length-to-width ratio (aspect ratio), image processing of the type that image processing is performed on part of a face and the shape of an area where the image processing is to be performed is often elongated, such as "wrinkle elimination", is selected as the optimum type. The process is then terminated.

On the other hand, if the length of the longer side of the user designated range 3013 is less than two times as long as the length of the shorter side (NO to the step S1207) as shown in FIG. 22 for example, "mole removal" is selected as the optimum type from among the above-mentioned three types of image processing (step S1209). Specifically, if the shape of the user designated range 3013 is substantially square even though substantially the whole area of the user designated range 3013 overlaps the face image area 4013 and the user designated range 3013 is much smaller than the face image area 4013, image processing of the type that image processing is performed on part of a face and an area where the image processing is to be performed is often substantially square, such as "mole removal", is selected as the optimum type. The process is then terminated.

If not less than 80% of the area of the user designated range 3013 is not included in the face image area 4013 (NO to the step S1202), if not less than 95% of the area of the user designated range 3013 is not included in the face image area 4013 (NO to the step S1205), or if the area of the user designated range 3013 is not greater than 0.1 times as large as the area of the face image area 4013 (NO to the step S1206), it is determined in a step S1210 whether or not the above sequence of determinations, i.e. the steps S1202, S1203, S1205, and S1206 has been completed with respect to coordinate data on all the face image areas 4013 generated by the face image detecting section 1104. If the above sequence of determinations has not been completed yet, the process returns to the step S1201, so that the steps S1202 to S1210 are executed for the other face image areas 4013. If the above sequence of determinations has been completed, it is determined that image processing of the type performed when the step S1112 in FIG. 17 was executed last time will be performed again with a high probability, and this type of image processing is selected as the optimum type, followed by termination of the process.

According to the process of FIG. 23, since the optimum type is selected from among the above-mentioned three types of image processing on the basis of the user designated range 3013 defined by the starting point coordinated 3011 and the ending point coordinates 3012 and the face image area 4013 (step S1204, S1208, S1209, or S1211), one type of image processing is automatically selected when either one of a plurality of types of image processing, such as correction or processing, is performed for a processing range designated for image data. Therefore, the user does not have to select the type of image processing, and hence user friendliness can be improved.

Figure 24:
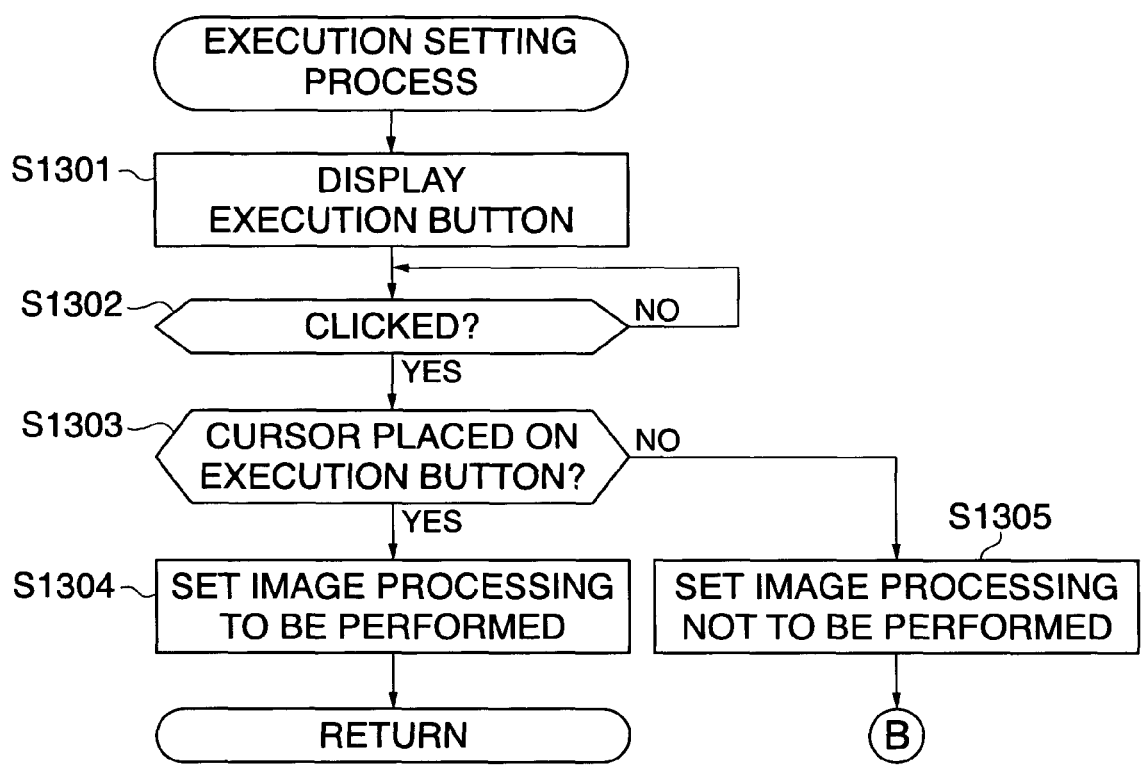
FIG. 24 is a flow chart showing an execution setting process carried out in a step S1110 in FIG. 17.

FIG. 24 is a flow chart showing in detail the execution setting process carried out in the step S1110 in FIG. 17.

In the execution setting process, first, the display controller 1102 displays the execution button 5010 corresponding to the type of image processing selected in the step S1109 in FIG. 17 on the display 1008, and then the input controller 1103 acquires information on an input to the execution button 5010 using the mouse 1011 to acquire data on whether image processing is permitted or not.

As shown in FIG. 24, first, in a step S1301, the execution button 5010 as shown in FIG. 20 is displayed in the vicinity of the ending point coordinates 3012 acquired in the step S1106 in FIG. 17. The name of the optimum type selected in the step S1109, e.g. "beautiful skin processing" is displayed on the execution button 5010. Then, clicking of the mouse button is awaited, and when the mouse button is clicked (YES to a step S1302), coordinate data on the mouse cursor at the time point the mouse button was clicked is acquired to determine whether or not the mouse cursor was placed on the execution button 5010 (step S1303). If the mouse cursor was placed on the execution button 5010, a setting is made such that image processing is to be performed in the step S1112 in FIG. 17 (step S1304), followed by termination of the process.

On the other hand, if the mouse cursor was not placed on the execution button 5010, that is, if the mouse cursor was placed at a position unrelated to the execution button 5010 or on the end button 2002 on the image editing screen 2000, a setting is made such that image processing is not to be performed in the step S1112, so that the process of FIG. 17 is terminated with the step S1112 being skipped (step S1305). On this occasion, the designation of the user designated range 3013 is cancelled.

According to the process of FIGS. 17, 23 and 24, image processing of the type that will be applied with the highest possibility is selected based on the positional relationship and the area ratio between the face image area 4013 detected by the face image detecting section 1104 and the user designated range 3013 designated by the user as well as the shape (aspect ratio) of the user designated range 3013 (the sequence of determining processes in FIG. 23), and the selected type of image processing is displayed on the execution button 5010 (step S1303 in FIG. 24), so that the user has only to click the execution button 5010 so as to permit execution of image processing (step S1304 in FIG. 24). As a result, user friendliness of the image processing apparatus 1000 can be improved.

Also, the execution setting process of FIG. 24 is carried out in the step S1110 without performing image processing in the step S1112 immediately after the optimum type of image processing is selected in the step S1109 in FIG. 17, the user can be prompted to check if the result of the above sequence of determinations coincides with the his/her intent. That is, since image processing is not immediately performed, the user designated range 3013 is still displayed on the display 1008, so that the user can reconfirm the designated position of the user designated range 3013 or the like. On the other hand, if the result of the above sequence of determining processes does not coincide with the user's intent, a setting is made in the step S1305 such that image processing is not to be performed. This prevents image processing from being improperly performed.

Further, for example in the case where the user designates the user designated range 3013 by mistake, the user's designation of the user designated range 3013 can be cancelled only by clicking the mouse button only once when the mouse cursor is displayed at a position unrelated to the execution button 5010.

A description will now be given of an image processing apparatus according to a third embodiment of the present invention.

In the above described second embodiment, when the user designated range 3013 is designated in the step S1107 in FIG. 17, the execution button 5010 on which only the optimum type of image processing is written in the step S1110 is automatically displayed on the display 1008, making it unnecessary for the user to select the type of image processing to improve user friendliness. On the other hand, in the third embodiment, it is arranged such that the user can select a desired type of image processing, so that a different type of image processing from an automatically selected type can be easily selected.

The image processing apparatus according to the third embodiment is identical in hardware configuration and software configuration to the image processing apparatuses (FIGS. 1 and 16) according to the above described first and second embodiments, and therefore only different points will be described with duplicate description omitted.

Figure 25:
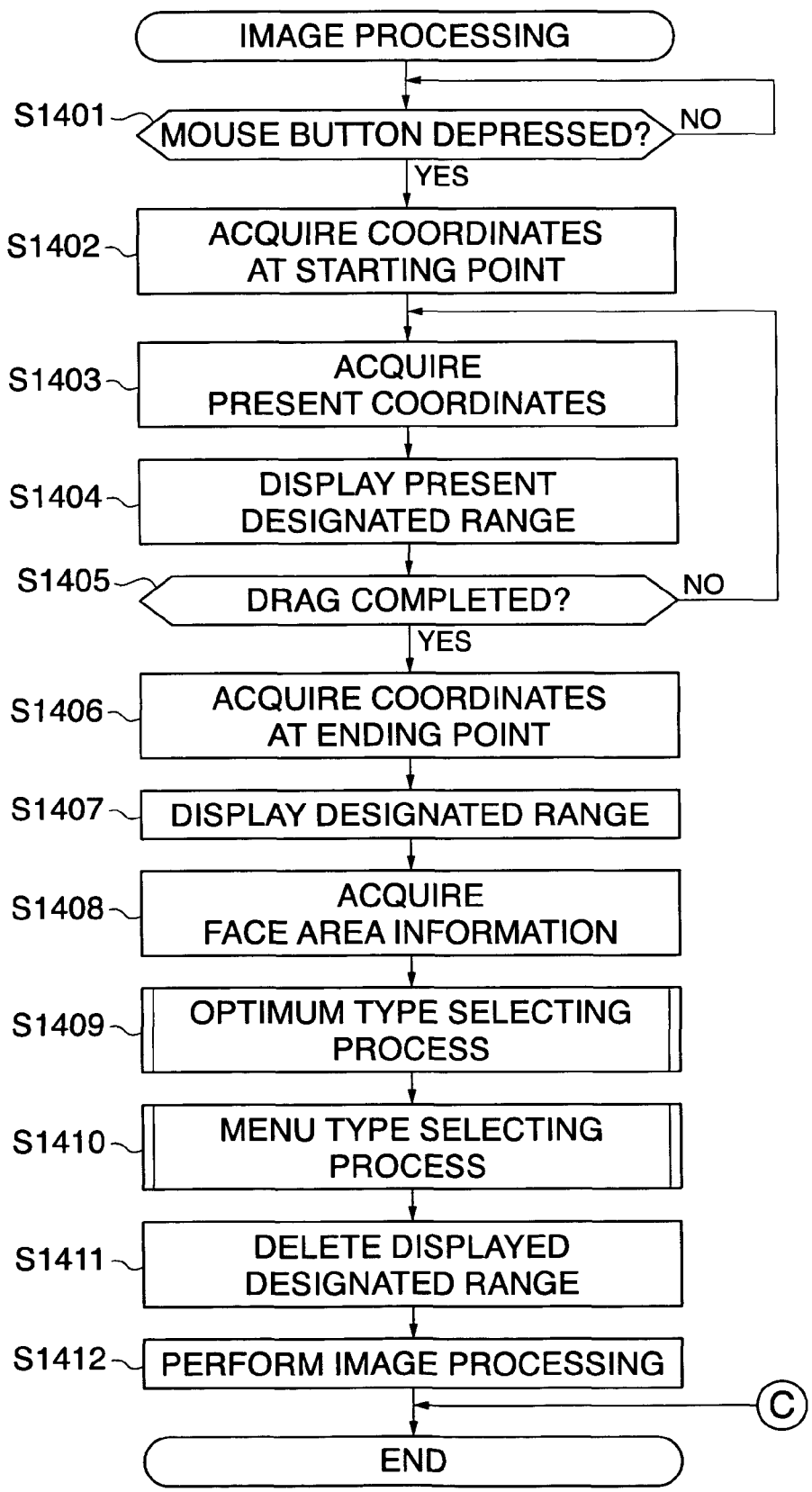
FIG. 25 is a flow chart showing image processing carried out by an image processing apparatus according to a third embodiment of the present invention.

FIG. 25 is a flow chart showing image processing performed by the image processing apparatus according to the third embodiment.

The contents of processing performed in steps S1401 to S1409 and S1411 in FIG. 25 are the same as those in the steps S1101 to S1109 in FIG. 17 according to the first embodiment, and therefore description thereof is omitted.

As shown in FIG. 25, in a step S1410, in accordance with the result of selection in a step S1409, the display controller 1102 displays a menu selecting screen 6010, described later with reference to FIG. 26, and the image processing selecting section 1105 carries out a menu type selecting process, described later with reference to FIG. 27. As a result, the input controller 1103 acquires the type of image processing input by the user via the mouse 1011. In a step S1412, the image processing section 1106 performs image processing of the type acquired in the step S1410.

Figure 27:
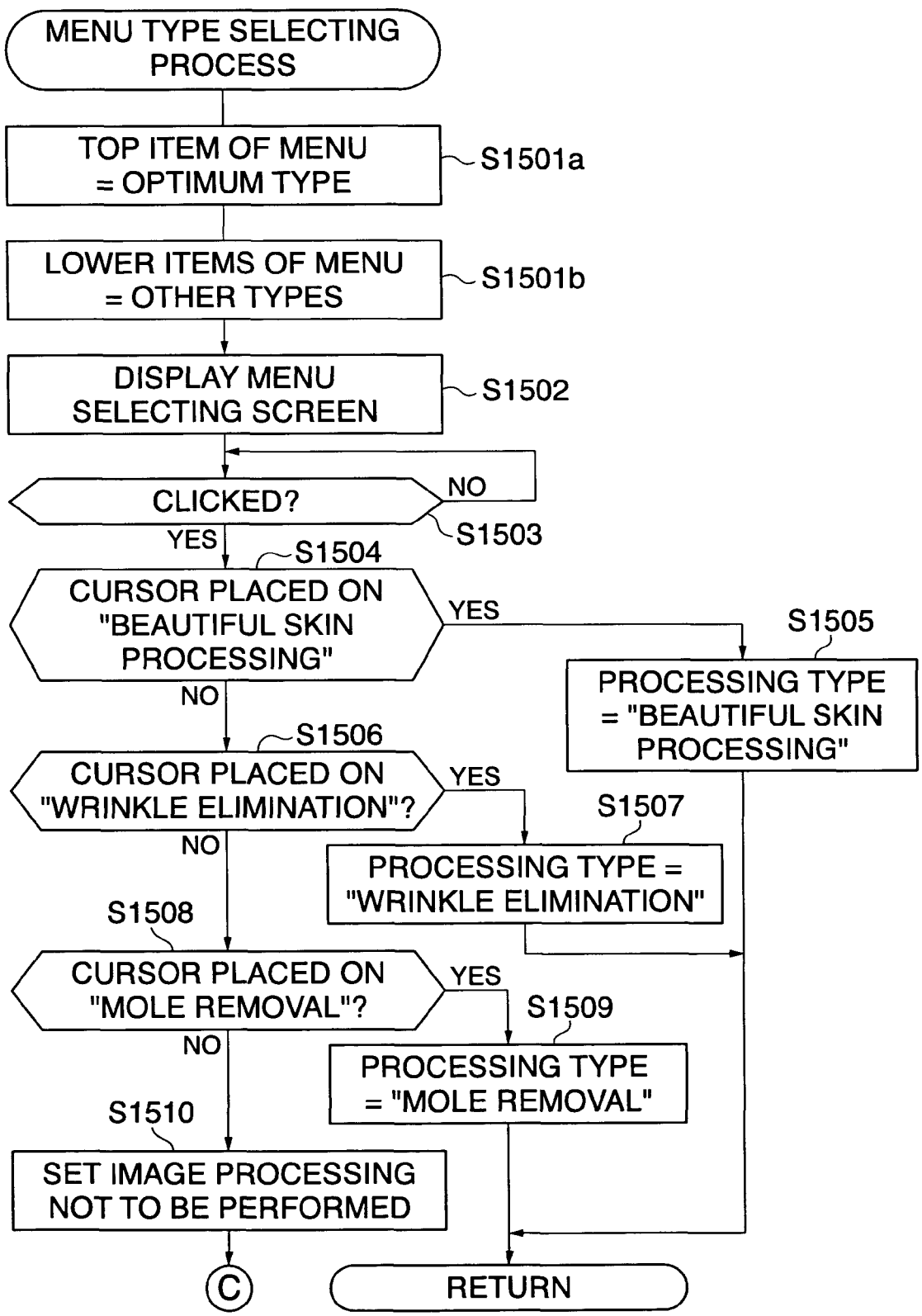
FIG. 27 is a flow chart showing in detail the menu type selecting process carried out in the step S1410 in FIG. 25.
Figure 29:
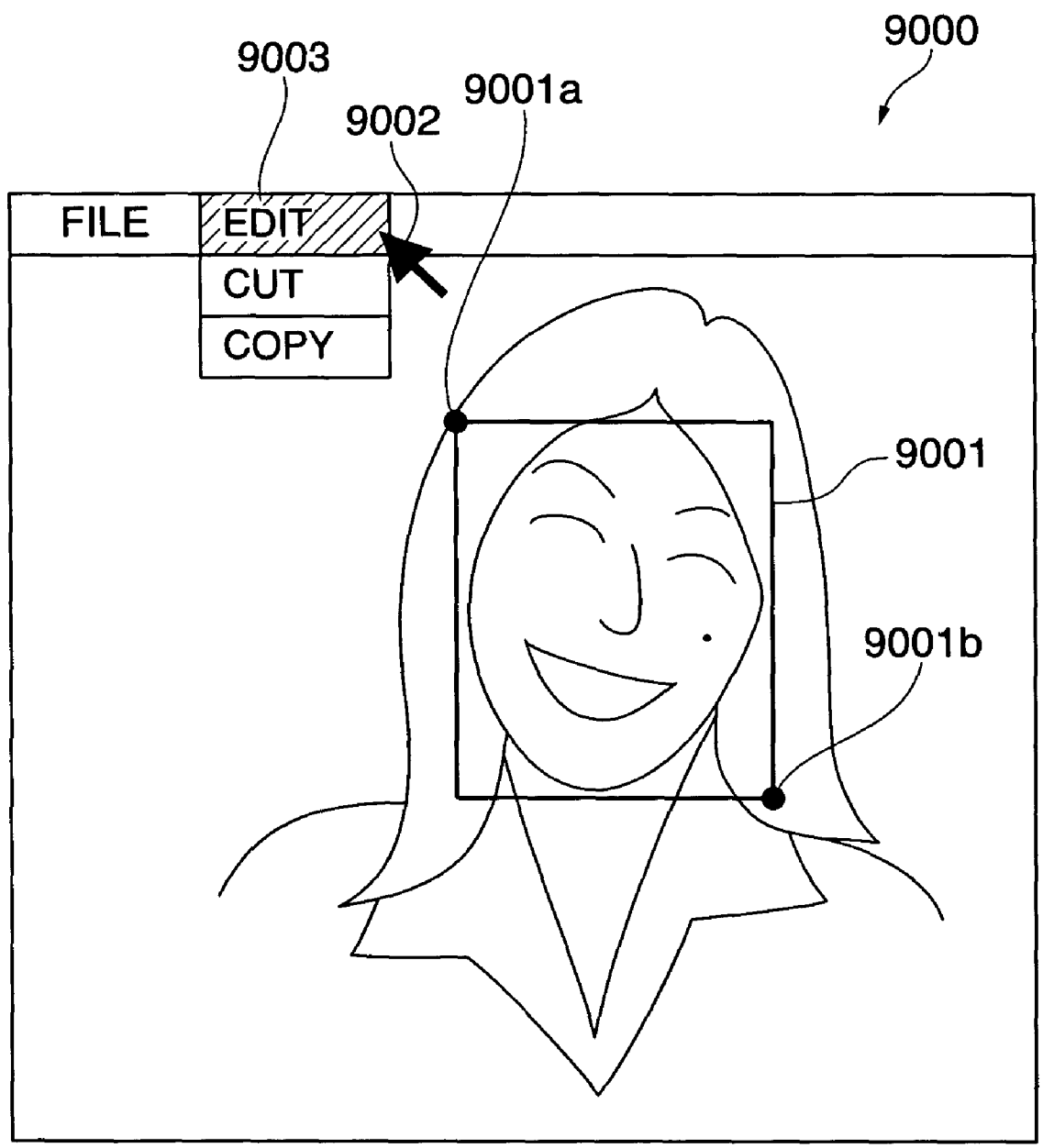
FIG. 29 is a view showing an example of a screen displayed on a LCD of a conventional image processing apparatus.
Figure 30:
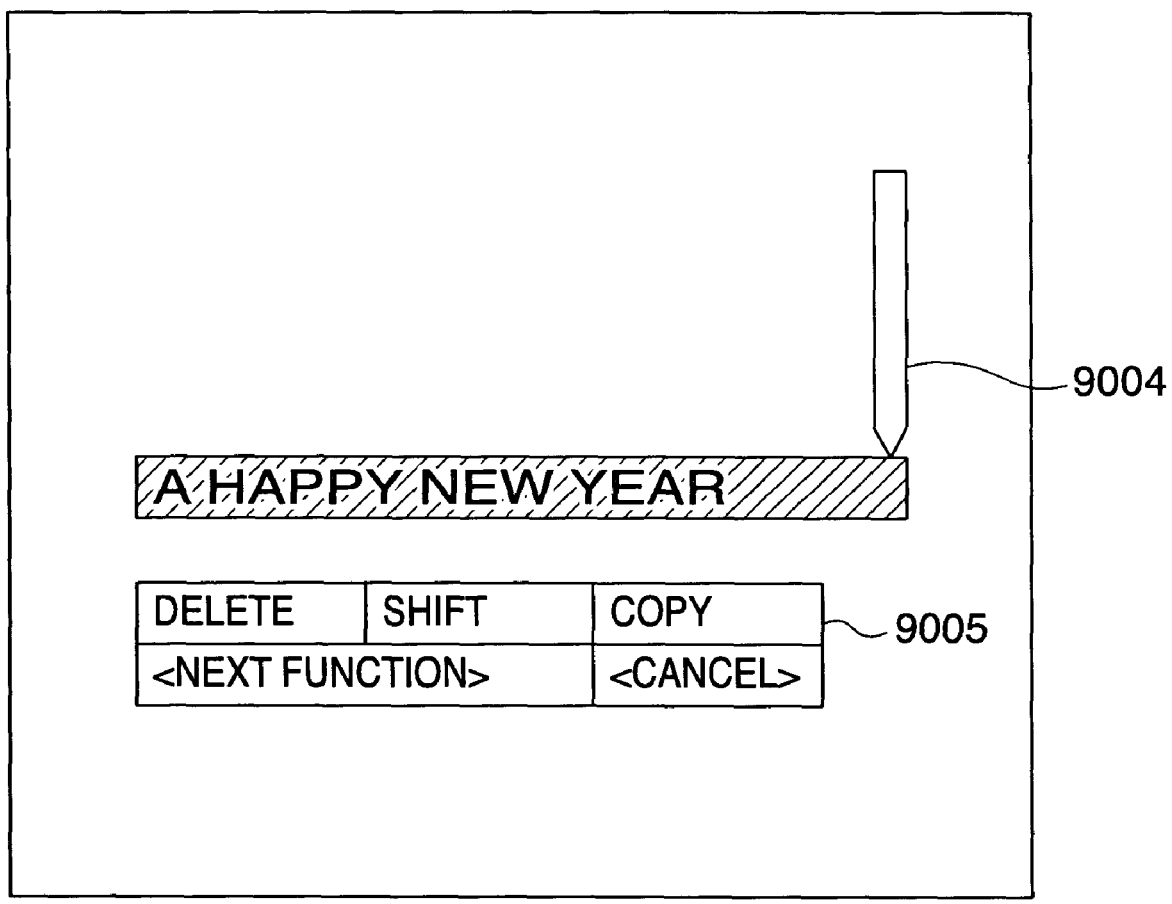
FIG. 30 is a view showing an example of a screen displayed on the LCD when the conventional image processing apparatus carries out a document editing process.

FIG. 27 is a flow chart showing in detail the menu type selecting process carried out in the step S1410 in FIG. 25.

Figure 26:
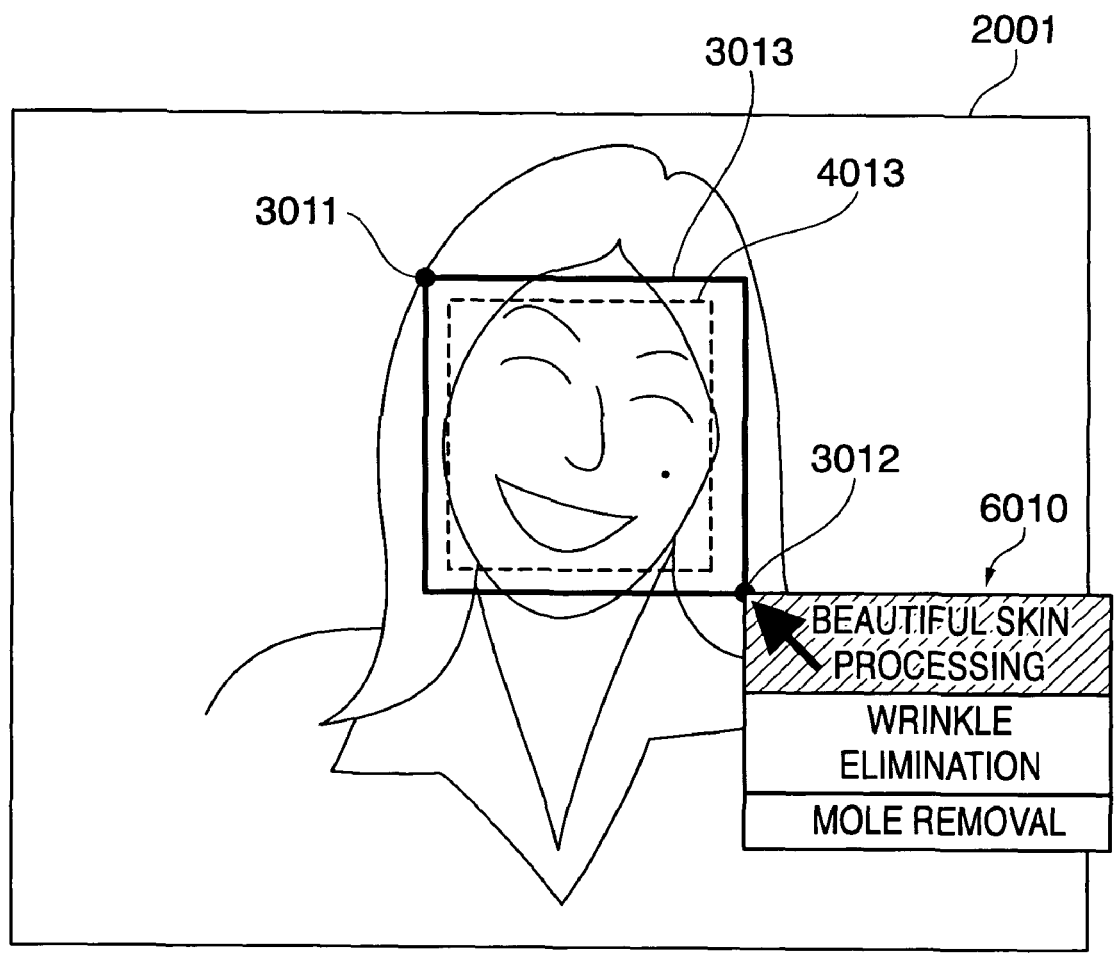
FIG. 26 is a view showing an example of the layout of a menu type selecting screen for carrying out a menu type selecting process in a step S1410 in FIG. 25.

As shown in FIG. 27, first, the name of the optimum type, e.g. "beautiful skin processing" selected in the step S1409 in FIG. 25 is set as an item to be displayed at the top (upper part) of the menu selecting screen 6010 in FIG. 26 (step S1501a). The names of other types of image processing, e.g. "wrinkle elimination" and "mole removal" are set as items to be displayed in the lower part of the menu selecting screen 6010 (step S1501b). The menu selecting screen 6010 on which these items (menu information) are set is displayed on the display 1008 (step S1502).

Then, in a step S1503, clicking of the mouse button is awaited. When the mouse button is clicked (YES to the step S1503), coordinate data on the mouse cursor at the time point the mouse button was clicked is acquired to determine whether or not the mouse cursor was placed on the selectable item "beautiful skin processing" on the menu selecting screen 6010 (step S1504). If the mouse cursor was placed on the item "beautiful skin processing", a setting is made such that image processing of the type "beautiful skin processing" is to be performed in the step S1412 (step S1505), followed by termination of the process.

Then, it is determined whether or not the mouse cursor was placed on the selectable item "wrinkle elimination" on the menu selecting screen 6010 (step S1506). If the mouse cursor was placed on the item "wrinkle elimination", a setting is made such that image processing of the type "wrinkle elimination" is to be performed in the step S1412 (step S1507), followed by termination of the process. Then, it is determined whether or not the mouse cursor was placed on the selectable item "mole removal" on the menu selecting screen 6010 (step S1508). If the mouse cursor was placed on the item "mole removal", a setting is made such that image processing of the type "mole removal" is to be performed in the step S1412 (step S1509), followed by termination of the process.

On the other hand, if the mouse cursor was not placed on the menu selecting screen 6010 (NO to the steps S1504, S1506, and S1508), i.e. if the mouse cursor was placed at a position unrelated to the menu selecting screen 6010 or on the end button 2002 on the image editing screen 2000, a setting is made such that image processing is not to be performed in the step S1412 in FIG. 25, so that the process of FIG. 25 is terminated with the step S1412 skipped (step S1510). On this occasion, the designation of the user designated range 3013 is cancelled.

According to the process of FIG. 25, as shown in FIG. 26, the menu display screen 6010 is displayed in the vicinity of the ending point coordinates 3012, and the type of image processing that is considered to be applied with the highest probability is displayed as the top item on the menu selecting screen 6010 (steps S1501a and S1502). As a result, the user can select the optimum type of image processing without substantially moving the mouse cursor positioned in the vicinity of the ending coordinates 3012, and therefore user friendliness of the image processing apparatus 1000 can be improved.

Also, in the case where the optimum type selected automatically in the step S1409 in FIG. 25 does not coincide with the user's intent, or in the case where the user designates the user designated range 3013 by mistake, the same effects can be obtained as in the above described second embodiment.

Although in the step S1501b in FIG. 27, all the types that have not been selected as the optimum type are set as lower items on the menu selecting screen 6010, control may be provided such that the type which is clearly unlikely to be applied is excluded from types to be set. For example, if "beautiful skin processing" is selected as the optimum type, the user designated range 3013 occupies most of the area of the face image area 4013. Therefore, it is determined that applying such types of image processing as "wrinkle elimination" and "mole removal" to the user designated range 3013 is inappropriate, and "wrinkle elimination" and "mole removal" may be not set as lower items on the menu selecting screen 6010.

Although in the above described second and third embodiments, there are three types of image processing: "beautiful skin processing", "wrinkle elimination", and "mole removal", the present invention may be applied to other types of image processing such as "spot removal." The number of types of image processing may be arbitrarily determined insofar as two or more of the above types are included. Further, it is preferred that the sequence of determining processes in the second and third embodiments, i.e. the way of determining the area of overlap (positional relationship) and the area ratio between the user designated range 3013 and the face image area 4013 as well as their shapes is set according to an image on which image processing is to be performed and the type of image processing to be performed.

Further, although in the above described second and third embodiments, the face image area 4013 corresponding to the skin of a person's face in an image is detected (steps S1108 and S1408) and used for the optimum type selecting process (steps S1109 and S1409), the present invention is not limited to this, but where image processing is performed on an area other than a person's face, an image area related to the image processing is detected and used for the optimum type selecting process.

Further, although in the above described second and third embodiments, the execution button 5010 or the menu selecting screen 6010 is displayed in the vicinity of the ending point coordinates 3012 of the user designated range 3013 (steps S1301 and S1502), the present invention is not limited to this, but where the execution button 5010 or the menu selecting screen 6010 cannot be displayed in the vicinity of the ending point coordinates 3012 because the ending point coordinates 3012 are located at an edge of the display 1008, control may be provided such that the execution button 5010 or the menu selecting screen 6010 is displayed at another position in the vicinity of the user designated range 3013.

Further, although in the above described second and third embodiments, the face image detecting section 1104 detects the face image area 4013 from image data in the step S1108 or S1408, the present invention is not limited to this, but the face image detecting section 1104 may detect the face image area 4013 in advance. In this case, it is arranged such that in the step S1108 or S1408, the image processing selecting section 1105 acquires coordinate data on the face image area 4013 that has been already detected.

The above described second and third embodiments can be each practiced in combination with the first embodiment.

Further, although in the above described second and third embodiments, it is assumed that image processing is performed on image data read from the HDD 1005, the present invention is not limited to this, image processing may be performed on image data newly created by the image editing application, image data generated through image pickup using an image sensor by the image processing apparatus 1000, image data that is acquired from an external apparatus by the image processing apparatus 1000 via a network such as the Internet, or image data that is externally supplied.

Further, although in the above described first to third embodiments, the sequence of processes up to image processing such as "beautiful skin processing" is consistently performed through execution of the image editing application, the present invention is not limited to this, data that designates the range and type of image processing is acquired and stored by executing a first application via the above-mentioned UIs, and image processing may be performed by executing a second application, different from the first application, based on the data stored by the first application. Further, it may be arranged such that the acquisition and storage of data that designates the range and type of image processing and image processing based on the stored data may be carried out by respective different apparatuses, and the data that designates the range and type of image processing may be transferred between the apparatuses.

Further, although in the above described first to third embodiments, the mouse 1011 is used as a pointing device for designating positions and areas, the present invention is not limited to this, but a touch-sensitive panel, and a tablet such as a stylus pen, or the like may be used. Alternatively, the keyboard 1010 may be used to designate positions and areas.

Further, although in the above described first to third embodiments, the image processing apparatus is implemented by a personal computer with the image editing application installed therein, any apparatus may be used as the image processing apparatus 1000 insofar as it can display images and perform image processing on image data.

FIG. 28 is a view showing a memory map of a storage medium according to a fourth embodiment of the present invention.

A storage medium 2800 according to the present embodiment is comprised of a CD-ROM, a DVD-ROM, or the like that stores various kinds of programs as shown in FIG. 28. Data dependent on the programs are managed in predetermined directories of the storage medium 2800.

Also, information for managing the programs, such as version information and information on program creators, is stored in the storage medium 2800. Further, information dependent on e.g. the OS of the apparatus that reads out the programs, such as an icon that identifies the programs, and a program for installing a variety of programs into the computer may be stored in the storage medium 2800. If a program to be installed is compressed, a program for expanding it may be stored in the storage medium 2800.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An image processing apparatus that performs a type of image processing selected from a plurality of types of image processing, on an image, comprising:
    a display device that displays the image;
    a designating device that designates a starting point and an ending point on the displayed image;
    a first acquiring device that acquires information on the starting point and the ending point;
    a selecting device that displays the plurality of types of image processing in an area set at a location based on the designated ending point on the displayed image and selects a type of image processing to be performed based on a user instruction;
    a second acquiring device that acquires information on the selected type of image processing;

a defining device that defines a processing area of the displayed image, in which the selected type of image processing is to be performed, according to the acquired information on the starting point and the ending point and the acquired information on the selected type of image processing, wherein
  a plurality of shapes for the processing area are set in advance according to the plurality of types of image processing, and
  said defining device sets the shape of the processing area to one of the plurality of shapes in accordance with the acquired information on the selected type of image processing; and
a display changing device that changes display of the image in the defined processing area.

2. An image processing apparatus according to claim 1, further comprising an image processing device that performs the selected type of image processing on at least part of the displayed image according to information on a part of the displayed image inside the defined processing area or a part of the displayed image outside the defined processing area and the selected type of image processing.

3. An image processing apparatus according to claim 2, wherein the plurality of types of image processing include a first type of image processing that is performed on the displayed image according to the information on the part of the displayed image inside the defined processing area, and a second type of image processing that is performed on the displayed image inside the defined processing area according to the information on the part of the displayed image outside the defined processing area.

4. An image processing apparatus according to claim 1, further comprising a second display device that displays a selecting screen for selecting a type of image processing to be performed on the displayed image from among the plurality of types of image processing in a vicinity of the starting point or ending point.

5. An image processing apparatus according to claim 4, wherein said designating device designates a first position and a second position different from the first position as the starting point and ending point, respectively, and
  said second display device displays the selecting screen in a vicinity of the designated ending point.

6. An image processing method of performing a type of image processing selected from a plurality of types of image processing, on an image, comprising:
  a display step of displaying the image;
  a designating step of designating a starting point and an ending point on the displayed image;
  a first acquiring step of acquiring information on the starting point and the ending point;
  a displaying step of displaying the plurality of types of image processing in an area set at a location based on the designated ending point on the displayed image;
  a selecting step of selecting a type of image processing to be performed based on a user instruction;
  a second acquiring step of acquiring information on the selected type of image processing;
  a defining step of defining a processing area of the displayed image, in which the selected type of image processing is to be performed, according to the acquired information on the starting point and ending point and the acquired information on the selected type of image processing, wherein
    a plurality of shapes for the processing area are set in advance according to the plurality of types of image processing, and
    in said defining step, the shape of the processing area is set to one of the plurality of shapes in accordance with the acquired information on the selected type of image processing; and
  a display changing step of changing display of the image in the defined processing area.

7. An image processing method according to claim 6, further comprising an image processing step of performing the selected type of image processing on at least part of the displayed image according to information on a part of the displayed image inside the defined processing area or a part of the displayed image outside the defined processing area and the selected type of image processing.

8. An image processing method according to claim 7, wherein the plurality of types of image processing include a first type of image processing that is performed on the displayed image according to the information on the part of the displayed image inside the defined processing area, and a second type of image processing that is performed on the displayed image inside the defined processing area according to the information on the part of the displayed image outside the defined processing area.

9. An image processing method according to claim 6, further comprising a second display step of displaying a selecting screen for selecting a type of image processing to be performed on the displayed image from among the plurality of types of image processing in a vicinity of the starting point or ending point.

10. An image processing method according to claim 9, wherein
  said designating step comprises designating a first position and a second position different from the first position as the starting point and the ending point, respectively, and
  said second display step comprises displaying the selecting screen in a vicinity of the designated ending point.

11. A non-transitory computer-readable storage medium having a program stored thereon for causing a computer to execute an image processing method on an image by performing a type of image processing selected from a plurality of types of image processing, said method comprising:
  displaying the image;
  designating a starting point and an ending point on the displayed image;
  acquiring information on the starting point and the ending point;
  displaying the plurality of types of image processing in an area including the designated ending point on the displayed image to permit a type of image processing to be performed on the displayed image from among the plurality of types of image processing;
  acquiring information on the selected type of image processing;
  defining a processing area on the displayed image, in which the displayed image is to be subjected to the selected type of image processing, according to the acquired information on the starting point and the ending point and the acquired information on the selected type of image processing, wherein
    a plurality of shapes for the processing area are set in advance according to the plurality of types of image processing, and
    in said defining step, the shape of the processing area is set to one of the plurality of shapes in accordance with the acquired information on the selected type of image processing; and
  changing display of the image in the defined processing area.

* * * * *